(12) United States Patent
Huang et al.

(10) Patent No.: US 11,095,410 B2
(45) Date of Patent: Aug. 17, 2021

(54) TRANSMISSION METHOD AND DEVICE BASED ON UPLINK TRANSMISSION INDICATION INFORMATION

(71) Applicant: CHINA ACADEMY OF TELECOMMUNICATIONS TECHNOLOGY, Beijing (CN)

(72) Inventors: Qiuping Huang, Beijing (CN); Qiubin Gao, Beijing (CN); Rakesh Tamrakar, Beijing (CN); Runhua Chen, Beijing (CN); Xin Su, Beijing (CN); Hui Li, Beijing (CN); Mengjun Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/638,456

(22) PCT Filed: Aug. 10, 2018

(86) PCT No.: PCT/CN2018/099896
§ 371 (c)(1),
(2) Date: Feb. 11, 2020

(87) PCT Pub. No.: WO2019/029684
PCT Pub. Date: Feb. 14, 2019

(65) Prior Publication Data
US 2020/0366429 A1    Nov. 19, 2020

(30) Foreign Application Priority Data

Aug. 11, 2017 (CN) .......................... 201710687934.0

(51) Int. Cl.
*H04L 12/28* (2006.01)
*H04L 5/00* (2006.01)
(Continued)

(52) U.S. Cl.
CPC ......... *H04L 5/0048* (2013.01); *H04B 7/0456* (2013.01); *H04B 7/0632* (2013.01);
(Continued)

(58) Field of Classification Search
CPC ... H04B 7/0456; H04B 7/0486; H04L 5/0044; H04L 25/0226; H04L 25/0224; H04W 24/10
(Continued)

(56) References Cited

U.S. PATENT DOCUMENTS

2009/0247229 A1   10/2009   Teo et al.
2014/0079001 A1   3/2014   Noh et al.
(Continued)

FOREIGN PATENT DOCUMENTS

CN    101908916 A    12/2010
CN    102882657 A    1/2013
(Continued)

OTHER PUBLICATIONS

International Search Report in the international application No. PCT/CN2018/099896, dated Oct. 17, 2018.
(Continued)

*Primary Examiner* — John Pezzlo
(74) *Attorney, Agent, or Firm* — Ladas & Parry, LLP

(57) ABSTRACT

A data transmission method, a base station, and a terminal are provided. The method corresponding to the base station includes sending SRS resource configuration information for uplink channel quality measurement and configuration information of a transmission layer quantity, wherein the configuration information of the transmission layer quantity includes a set of maximum quantities of transmission layers allowed to be transmitted by a terminal or the quantity of layers allowed to be transmitted by the terminal; determining uplink transmission indication information; determining
(Continued)

a payload corresponding to the uplink transmission indication information according to the SRS resource configuration information and the configuration information of the transmission layer quantity; sending the uplink transmission indication information to the terminal using the payload.

19 Claims, 4 Drawing Sheets

(51) Int. Cl.
    *H04B 7/0456*     (2017.01)
    *H04B 7/06*     (2006.01)
    *H04W 24/08*     (2009.01)
    *H04W 28/16*     (2009.01)
    *H04W 72/08*     (2009.01)
    *H04J 1/16*     (2006.01)

(52) U.S. Cl.
    CPC ........... *H04L 5/0044* (2013.01); *H04W 24/08* (2013.01); *H04W 28/16* (2013.01); *H04W 72/085* (2013.01)

(58) Field of Classification Search
    USPC ........................................ 370/252, 278, 329
    See application file for complete search history.

(56) References Cited

U.S. PATENT DOCUMENTS

| | | | |
|---|---|---|---|
| 2014/0140313 A1 | 5/2014 | Liu et al. | |
| 2015/0003391 A1* | 1/2015 | Chen | H04L 5/0044 370/329 |
| 2016/0227570 A1 | 8/2016 | Wei et al. | |
| 2017/0047975 A1 | 2/2017 | Lee et al. | |
| 2018/0331744 A1 | 11/2018 | Gao et al. | |
| 2019/0124538 A1* | 4/2019 | Tang | H04W 24/10 |
| 2020/0036438 A1* | 1/2020 | Kim | H04B 7/0669 |
| 2020/0068387 A1* | 2/2020 | Dou | H04W 80/08 |
| 2020/0083939 A1* | 3/2020 | Park | H04W 72/042 |
| 2020/0091977 A1* | 3/2020 | Hang | H04B 7/0486 |

FOREIGN PATENT DOCUMENTS

| | | |
|---|---|---|
| CN | 103687025 A | 3/2014 |
| CN | 105187181 A | 12/2015 |
| CN | 106685490 A | 5/2017 |
| EP | 2940885 A2 | 11/2015 |

OTHER PUBLICATIONS

Written Opinion of the International Searching Authority in the international application Na PCT/CN2018/099896, dated Oct. 17, 2018.
Lenovo, Motorola Mobility, "Discussion of SRS resource configuration" 3GPP TSG RAN WG1 Meeting #89 R1-1707764, Hangzhou, P.R. China May 15-17, 2017.
Taiwanese Office Action in Taiwanese patent application No. 107128132, dated May 8, 2019.
First Office Action and search report from CN app. No. 201710687934.0, dated Mar. 23, 2020, with English translation provided by Global Dossier.
Extended European Search Report from EP 18845069.6, dated May 20, 2020.
International Preliminary Report on Patentability from PCT/CN2018/099896, dated Feb. 11, 2020, with English translation from Global Dossier.
"Non-codebook based transmission for UL MIMO", R1-1709923, 3GPP TSG RAN WG1 NR Ad Hoc Meeting, Qingdao, China, Jun. 27-30, 2017.
"Codebook based transmission for UL MIMO", R1-1710447, 3GPP TSG RAN WG1 NR Ad Hoc Meeting, Qingdao, China, Jun. 27-30, 2017.
"On Diversity Based UL Transmission", R1-1710520, 3GPP TSG RAN WG1 NR Ad Hoc Meeting, Qingdao, China, Jun. 27-30, 2017.
"Details of QCL assumptions and related RS design considerations", R1-1709935, 3GPP TSG RAN WG1 NR Ad-Hoc #2, Qingdao, China, Jun. 27-30, 2017.
"Discussion on non-codebook based transmission for UL", R1-1710277, , 3GPP TSG RAN WG1 NR Ad-Hoc #2, Qingdao, China, Jun. 27-30, 2017.
"On non-codebook Based UL Transmission", R1-1710519, , 3GPP TSG RAN WG1 NR Ad-Hoc #2, Qingdao, China, Jun. 27-30, 2017.
Notice of Reasons for Refusal from JP app. No. 2020-529800, dated Mar. 9, 2021, with English translation from Global Dossier.
Notification of Reasons for Refusal from KR app. No. 10-2020-7006405, dated Apr. 15, 2021, with English translation from Global Dossier.

* cited by examiner

TRANSMISSION METHOD AND DEVICE BASED ON UPLINK TRANSMISSION INDICATION INFORMATION

CROSS-REFERENCE TO RELATED APPLICATIONS

This application is a U.S. national phase application of PCT Application No. PCT/CN2018/099896 filed on Aug. 10, 2018, which claims priority to Chinese Patent Application No. 201710687934.0 filed in China on Aug. 11, 2017, the disclosures of which are incorporated herein by reference in their entireties.

TECHNICAL FIELD

The present disclosure relates to the field of communication technology, and more particularly, relates to a data transmission method, a base station, and a terminal.

BACKGROUND

In a future New RAT (NR) communication system, such as a system based on a fifth-Generation (5G) mobile communication technology, both a codebook-based uplink transmission scheme and a non-codebook based uplink transmission scheme are supported.

In a case that channel reciprocity exists between uplink and downlink, non-codebook based uplink transmission may be considered. In an NR system, the non-codebook based uplink transmission scheme is that a base station configures, for a terminal, a plurality of SRS (Sounding Reference Signal) resources for measuring an uplink channel quality. Each SRS resource has a SRS port. For example, the base station configures 4 SRS resources for the terminal, but the base station considers, according to a network scheduling condition, that the terminal can only use at most 2 layers for transmission in a certain time period. If the base station does not indicate the maximum quantity of transmission layers to the terminal, the terminal assumes that a maximum of four transmission layers can be used and uses precoding corresponding to the 4 layers for performing encoding, which causes waste of resources. At the same time, the base station can only use an overhead corresponding to a configuration of 4 SRS resources to indicate the SRS resources to the terminal, which may cause a waste of overhead or a problem of a high payload.

SUMMARY

In view of the above, the present disclosure provides a data transmission method, a base station and a terminal to solve problems in the related art that waste of resources and high uplink transmission overhead or payload exist in an existing uplink transmission solution.

In order to solve the above technical problems, the present disclosure provides a data transmission method. The data transmission method is applied to a base station and includes: sending Sounding Reference Signal (SRS) resource configuration information for uplink channel quality measurement and configuration information of a transmission layer quantity, wherein the configuration information of the transmission layer quantity includes a set of maximum quantities of transmission layers allowed to be transmitted by the terminal or the quantity of layers allowed to be transmitted by the terminal; determining uplink transmission indication information; determining a payload corresponding to the uplink transmission indication information according to the SRS resource configuration information and the configuration information of the transmission layer quantity; sending the uplink transmission indication information to the terminal using the payload.

Optionally, determining the payload corresponding to the uplink transmission indication information according to the SRS resource configuration information and the configuration information of the transmission layer quantity, includes one of following (i) to (v): (i) determining the payload corresponding to the uplink transmission indication information according to one of a maximum quantity of antenna ports and a maximum quantity of transmission layers for uplink transmission allowed for the terminal and according to the SRS resource configuration information; (ii) determining the payload corresponding to the uplink transmission indication information according to the maximum quantity of transmission layers allowed within a maximum uplink transmission capability of the terminal and according to the SRS resource configuration information; (iii) determining the payload corresponding to the uplink transmission indication information according to a maximum layer quantity in the configuration information of the transmission layer quantity and according to the SRS resource configuration information; (iv) determining the payload corresponding to the uplink transmission indication information according to one or more elements in a layer quantity set indicated by the configuration information of the transmission layer quantity and according to the SRS resource configuration information; (v) determining the payload corresponding to the uplink transmission indication information according to the quantity of elements in the layer quantity set indicated by the configuration information of the transmission layer quantity and according to the SRS resource configuration information.

Optionally, determining the payload corresponding to the uplink transmission indication information according to the SRS resource configuration information and the configuration information of the transmission layer quantity, includes: measuring, by the base station, an SRS signal and selecting a Transmission Rank indicator (TRI), and/or an SRS resource, and/or an SRS port according to a result of the measurement; and determining the payload corresponding to the uplink transmission indication information according to at least one of the quantity of TRIs, the quantity of SRS ports, and the quantity of SRS resources selected by the base station and according to the SRS resource configuration information.

Optionally, determining the payload corresponding to the uplink transmission indication information according to the SRS resource configuration information and the configuration information of the transmission layer quantity, further includes: in a case that determining the payload corresponding to the uplink transmission indication information according to the SRS resource configuration information and the configuration information of the transmission layer quantity includes at least two determination manners, sending payload determination manner indication information to the terminal by the base station, wherein the payload determination manner indication information is instruction information indicating a determination manner for determining the payload corresponding to the uplink transmission indication information according to the SRS resource configuration information and the configuration information of the transmission layer quantity.

Optionally, the uplink transmission indication information includes at least one of target indication information and mapping relationship information; the target indication information includes at least one of an SRS resource indicator (SRI), a Transmission Rank indicator (TRI), and indication information of an SRS port in a SRS resource; the mapping relationship information includes at least one of: order information of SRS resources, order information of SRS ports in the SRS resources, mapping relationship information between the SRS resources and reference signal ports, mapping relationship information between the SRS resources and layers, mapping relationship information between the SRS ports in the SRS resources and the reference signal ports, and mapping relationship information between the SRS ports in the SRS resources and the layers.

Optionally, the mapping relationship information between the SRS resources and the reference signal ports includes: the SRS resource and the reference signal port being sent using a same precoding matrix, or the SRS resources and the reference signal ports being sent using a same precoding matrix; and/or the mapping relationship information between the SRS resource and the layer includes: the SRS resource and the layer being sent using a same precoding matrix, or the SRS resources and the layers being sent using a same precoding matrix; and/or the mapping relationship information between the SRS ports and the reference signal ports includes: the SRS port and reference signal being sent using the same precoding matrix, or the SRS ports and reference signals being sent using the same precoding matrix; and/or the mapping relationship information between the SRS ports and the layers includes: the SRS port and the layer being sent using the same precoding matrix, or the SRS ports and the layer being sent using the same precoding matrix.

Optionally, the method further includes: making an agreement with the terminal on mapping relationship between the uplink transmission indication information and reference signal ports or mapping relationship between the uplink transmission indication information and layers or specifying in advance in a protocol mapping relationship between the uplink transmission indication information and reference signal ports or mapping relationship between the uplink transmission indication information and layers.

Optionally, determining the uplink transmission indication information includes: receiving an SRS signal sent by the terminal on the SRS resources; and determining the uplink transmission indication information according to the SRS signal.

The present disclosure further provides a data transmission method. The data transmission method is applied to a terminal, and includes receiving configuration information of a transmission layer quantity and Sounding Reference Signal (SRS) resource configuration information for uplink channel quality measurement sent by a base station; sending an SRS signal on a configured SRS resource; determining, according to the SRS resource configuration information and the configuration information of the transmission layer quantity, a payload corresponding to the uplink transmission indication information sent by the base station; receiving uplink transmission indication information sent by the base station; and acquiring a precoding matrix for uplink data transmission according to the uplink transmission indication information.

Optionally, determining, according to the SRS resource configuration information and the configuration information of the transmission layer quantity, the payload corresponding to the uplink transmission indication information sent by the base station, includes one of the following (i) to (v): (i) determining, according to one of a maximum quantity of antenna ports and a maximum quantity of transmission layers for uplink transmission allowed for the terminal and the SRS resource configuration information, the payload corresponding to the uplink transmission indication information sent by the base station; (ii) determining, according to a maximum quantity of transmission layers allowed within a maximum uplink transmission capability of the terminal and the SRS resource configuration information, the payload corresponding to the uplink transmission indication information sent by the base station; (iii) determining, according to a maximum quantity of layers in the configuration information of the transmission layer quantity and the SRS resource configuration information, the payload corresponding to the uplink transmission indication information sent by the base station; (iv) determining, according to elements in a layer quantity set indicated by the configuration information of the transmission layer quantity and the SRS resource configuration information, the payload corresponding to the uplink transmission indication information sent by the base station; (v) determining, according to the quantity of the elements in the layer quantity set indicated by the configuration information of the transmission layer quantity and the SRS resource configuration information, the payload corresponding to the uplink transmission indication information sent by the base station.

Optionally, acquiring the precoding matrix for uplink data transmission according to the uplink transmission indication information includes: decoding the uplink transmission indication information according to the payload, and acquiring the precoding matrix for uplink data transmission based on a result of the decoding.

Optionally, the uplink transmission indication information includes at least one of target indication information and mapping relationship information;

the target indication information includes at least one of an SRS resource indicator (SRI), a Transmission Rank indicator (TRI), and indication information of an SRS port in an SRS resource; the mapping relationship information includes at least one of order information of SRS resources, order information of SRS ports in the SRS resources, mapping relationship information between SRS resources and reference signal ports, mapping relationship information between SRS resources and layers, mapping relationship information between SRS ports in the SRS resources and the reference signal ports, and mapping relationship information between the SRS ports in the SRS resource and layers.

Optionally, the mapping relationship information between the SRS resources and the reference signal ports includes: the SRS resource and the reference signal port being sent using a same precoding matrix, or the SRS resources and the reference signal ports being sent using a same precoding matrix; and/or the mapping relationship information between the SRS resource and the layer includes: the SRS resource and the layer being sent using a same precoding matrix, or the SRS resources and the layers being sent using a same precoding matrix; and/or the mapping relationship information between the SRS ports and the reference signal ports includes: the SRS port and the reference signal being sent using a same precoding matrix, or the SRS ports and the reference signals being sent using a same precoding matrix; and/or the mapping relationship information between the SRS ports and the layers includes: the SRS port and the layer being sent using a same precoding matrix, or the SRS ports and the layers being sent using a same precoding matrix.

Optionally, acquiring the precoding matrix for uplink data transmission according to the uplink transmission indication information, includes: determining a precoding vector/matrix corresponding to each reference signal port according to the mapping relationship information between the SRS resources and the reference signal ports or the mapping relationship information between the SRS ports and the reference signal ports; acquiring the precoding matrix for uplink data transmission according to the precoding vector/matrix corresponding to the each reference signal port.

Optionally, acquiring the precoding matrix for uplink data transmission according to the uplink transmission indication information, includes: determining a precoding vector/matrix corresponding to each layer according to the mapping relationship information between the SRS resources and the layers or the mapping relationship information between the SRS ports and the layers; acquiring a precoding matrix for uplink data transmission according to the precoding vector/matrix corresponding to each layer.

Optionally, the method further includes: making an agreement in advance with the base station on mapping relationship between the uplink transmission indication information and reference signal ports or mapping relationship between the uplink transmission indication information and layers or specifying in advance in a protocol mapping relationship between the uplink transmission indication information and reference signal ports or mapping relationship between the uplink transmission indication information and layers; or receiving the mapping relationship between the uplink transmission indication information and the reference signal ports or the mapping relationship between the uplink transmission indication information and the layers sent by the base station.

Optionally, the method further includes: receiving the uplink transmission indication information.

The present disclosure further provides a base station. The base station includes a first sending module, configured to send Sounding Reference Signal (SRS) resource configuration information for uplink channel quality measurement and configuration information of a transmission layer quantity, wherein the configuration information of the transmission layer quantity includes a set of maximum quantities of transmission layers allowed to be transmitted by the terminal or the quantity of layers allowed to be transmitted by the terminal; a first determining module, configured to determine uplink transmission indication information; a second determining module, configured to determine a payload corresponding to the uplink transmission indication information according to the SRS resource configuration information and the configuration information of the transmission layer quantity; a second sending module, configured to send the uplink transmission indication information to the terminal using the payload.

Optionally, the second determination module is specifically configured to perform one of following (i) to (v): (i) determining the payload corresponding to the uplink transmission indication information according to one of a maximum quantity of antenna ports and a maximum quantity of transmission layers for uplink transmission allowed for the terminal and according to the SRS resource configuration information; (ii) determining the payload corresponding to the uplink transmission indication information according to a maximum quantity of transmission layers allowed within a maximum uplink transmission capability of the terminal and according to the SRS resource configuration information; (iii) determining the payload corresponding to the uplink transmission indication information according to the maximum layer quantity in the configuration information of the transmission layer quantity and according to the SRS resource configuration information; (iv) determining the payload corresponding to the uplink transmission indication information according to one or more elements in a layer quantity set indicated by the configuration information of the transmission layer quantity and according to the SRS resource configuration information; (v) determining the payload corresponding to the uplink transmission indication information according to the quantity of elements in the layer quantity set indicated by the configuration information of the transmission layer quantity and according to the SRS resource configuration information.

Optionally, the second determining module is specifically configured to: measure an SRS signal and select a Transmission Rank indicator (TRI), and/or an SRS resource, and/or an SRS port according to a result of the measurement; and determine the payload corresponding to the uplink transmission indication information according to at least one of the quantity of TRIs, the quantity of SRS ports, and the quantity of SRS resources selected by the base station and the SRS resource configuration information.

Optionally, the second determining module is specifically configured to: in a case that determining the payload corresponding to the uplink transmission indication information according to the SRS resource configuration information and the configuration information of the transmission layer quantity includes at least two determination manners, send payload determination manner indication information to the terminal, the payload determination manner indication information is instruction information indicating a determination manner for determining the payload corresponding to the uplink transmission indication information according to the SRS resource configuration information and the configuration information of the transmission layer quantity.

Optionally, the uplink transmission indication information includes at least one of target indication information and mapping relationship information; the target indication information includes at least one of an SRS resource indicator (SRI), a Transmission Rank indicator (TRI), and indication information of an SRS port in an SRS resource; the mapping relationship information includes at least one of following: order information of SRS resources, order information of SRS ports in the SRS resources, mapping relationship information between the SRS resources and reference signal ports, mapping relationship information between the SRS resources and layers, mapping relationship information between the SRS ports in the SRS resources and the reference signal ports, and mapping relationship information between the SRS ports in the SRS resources and the layers.

Optionally, the mapping relationship information between the SRS resources and the reference signal ports includes: the SRS resource and the reference signal port being sent using a same precoding matrix, or the SRS resources and the reference signal ports being sent using a same precoding matrix; and/or the mapping relationship information between the SRS resource and the layer includes: the SRS resource and the layer being sent using a same precoding matrix, or the SRS resources and the layers being sent using a same precoding matrix; and/or the mapping relationship information between the SRS ports and the reference signal ports includes: the SRS ports and the reference signals being sent using a same precoding matrix, or the SRS port and the reference signal being sent using a same precoding matrix; and/or the mapping relationship information between the SRS ports and the layers includes: the SRS port and the layer being transmitted using a same precoding matrix, or the SRS ports and the layers being transmitted using a same precoding matrix.

Optionally, the base station further includes: an agreement module, configured to make an agreement with a terminal on mapping relationship between the uplink transmission indication information and reference signal ports or mapping relationship between the uplink transmission indication information and layers or specify in advance in a protocol mapping relationship between the uplink transmission indication information and reference signal ports or mapping relationship between the uplink transmission indication information and layers.

Optionally, the first determining module is specifically configured to receive an SRS signal sent by the terminal on the SRS resources and determine the uplink transmission indication information according to the SRS signal.

The present disclosure further provides a terminal. The terminal includes a first receiving module, configured to receive configuration information of a transmission layer quantity and Sounding Reference Signal (SRS) resource configuration information for uplink channel quality measurement sent by a base station; a sending module, configured to send an SRS signal on a configured SRS resource; a determining module, configured to determine, according to the SRS resource configuration information and the configuration information of the transmission layer quantity, a payload corresponding to the uplink transmission indication information sent by the base station, a second receiving module, configured to receive uplink transmission indication information sent by the base station; and an acquiring module, configured to acquire a precoding matrix for uplink data transmission according to the uplink transmission indication information.

Optionally, the determining module is specifically configured to perform one of following (i) to (v): (i) determining, according to one of a maximum quantity of antenna ports and a maximum quantity of transmission layers for uplink transmission allowed for the terminal and according to the SRS resource configuration information, the payload corresponding to the uplink transmission indication information sent by the base station; (ii) determining, according to a maximum quantity of transmission layers allowed within a maximum uplink transmission capability of the terminal and the SRS resource configuration information, the payload corresponding to the uplink transmission indication information sent by the base station; (iii) determining, according to a maximum quantity of layers in the configuration information of the transmission layer quantity and the SRS resource configuration information, the payload corresponding to the uplink transmission indication information sent by the base station; (iv) determining, according to elements in a layer quantity set indicated by the configuration information of the transmission layer quantity and the SRS resource configuration information, the payload corresponding to the uplink transmission indication information sent by the base station; (v) determining, according to the quantity of elements in the layer quantity set indicated by the configuration information of the transmission layer quantity and the SRS resource configuration information, the payload corresponding to the uplink transmission indication information sent by the base station.

Optionally, the acquiring module is further configured to: decode the uplink transmission indication information according to the payload, and acquire the precoding matrix for uplink data transmission based on a result of the decoding.

Optionally, the uplink transmission indication information includes at least one of target indication information and mapping relationship information; the target indication information includes at least one of an SRS resource indicator (SRI), a Transmission Rank indicator (TRI), and indication information of an SRS port in an SRS resource; the mapping relationship information includes at least one of: order information of SRS resources, order information of SRS ports in the SRS resources, mapping relationship information between SRS resources and reference signal ports, mapping relationship information between the SRS resources and layers, mapping relationship information between SRS ports in the SRS resources and the reference signal ports, and mapping relationship information between the SRS ports in the SRS resource and the layers.

Optionally, the mapping relationship information between the SRS resources and the reference signal ports includes: the SRS resource and the reference signal port being sent using a same precoding matrix, or the SRS resources and the reference signal ports being sent using a same precoding matrix; and/or the mapping relationship information between the SRS resource and the layer includes: the SRS resource and the layer being sent using a same precoding matrix, or the SRS resources and the layers being sent using a same precoding matrix; and/or the mapping relationship information between the SRS ports and the reference signal ports includes: the SRS port and the reference signal being sent using a same precoding matrix, or the SRS ports and the reference signals being sent using a same precoding matrix; and/or the mapping relationship information between the SRS ports and the layers includes: the SRS port and the layer being sent using a same precoding matrix, or the SRS ports and the layers being sent using a same precoding matrix.

Optionally, the acquiring module is specifically configured to: determine a precoding vector/matrix corresponding to each reference signal port according to the mapping relationship information between the SRS resources and the reference signal ports or the mapping relationship information between the SRS ports and the reference signal ports; acquire the precoding matrix for uplink data transmission according to the precoding vector/matrix corresponding to the each reference signal port.

Optionally, the acquiring module is specifically configured to: determine a precoding vector/matrix corresponding to each layer according to the mapping relationship information between the SRS resources and the layers or the mapping relationship information between the SRS ports and the layers; acquire a precoding matrix for uplink data transmission according to a precoding vector/matrix corresponding to each layer.

Optionally, the terminal further includes an agreement module, wherein the agreement module is configured to: make an agreement with the base station on mapping relationship between the uplink transmission indication information and reference signal ports or mapping relationship between the uplink transmission indication information and layers or specify in advance in a protocol mapping relationship between the uplink transmission indication information and reference signal ports or mapping relationship between the uplink transmission indication information and layers.

Optionally, the terminal further includes: a third receiving module, configured to receive the uplink transmission indication information.

The present disclosure further provides a base station. The base station includes a storage, a processor, a transceiver, and a computer program stored on the storage and executable by the processor; wherein when the processor executes the computer program, the processor implements steps in the data transmission method applied to the base station.

The present disclosure further provides a terminal. The terminal includes a storage, a processor, a transceiver, and a computer program stored on the storage and executable by the processor; wherein when the processor executes the computer program, the processor implements steps in the data transmission method applied to the terminal.

The present disclosure further provides a computer readable storage medium for storing a computer program, wherein when the computer program is executed by a processor, the processor implements steps in the method applied to the base station, or steps in the method applied to the terminal.

The advantages of the above technical solutions of the present disclosure are as follows: the present disclosure can reduce an overhead or a payload for uplink transmission in a NR system by sending SRS resource configuration information and configuration information of the transmission layer quantity to determine a payload corresponding to uplink transmission indication information.

DETAILED DESCRIPTION

Detailed description of embodiments of the present disclosure will now be described in further detail with reference to accompanying drawings and examples. The following embodiments are used to illustrate the present disclosure, but are not intended to limit the scope of the present disclosure.

A Sounding Reference Signal (SRS) in the present disclosure is an uplink reference signal having functions such as channel quality measurement and/or channel estimation and/or interference measurement, and may be an uplink sounding signal or other uplink reference signals having functions such as the channel quality measurement and/or the channel estimation and/or the interference measurement, and the scope of the present disclosure should not be limited by a name of the SRS. For example, the SRS in the present disclosure may also be the Sounding Reference Signal.

Figure 1:
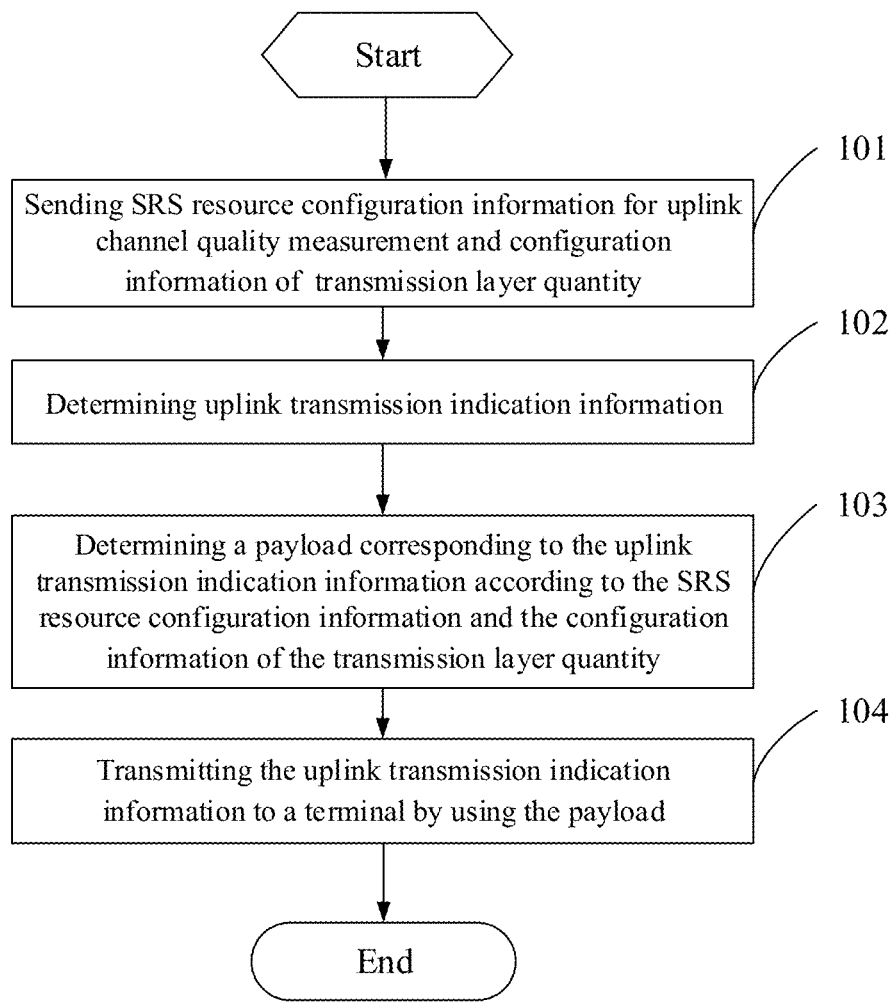
FIG. 1 is a flowchart of a data transmission method according to some embodiments of the present disclosure.

Referring to FIG. 1, FIG. 1 is a data transmission method provided by some embodiments of the present disclosure. As shown in FIG. 1, the data transmission method is applied to a base station, and includes the following steps S101 to S104.

Step 101: sending SRS resource configuration information for uplink channel quality measurement and configuration information of a transmission layer quantity.

In this step, the base station may transmit the SRS resource configuration information and the configuration information of the transmission layer quantity to the terminal. The SRS resource configuration information may include the quantity of SRS resources and the quantity of SRS ports in the SRS resources. For example, the base station may configure N SRS resources for the terminal in the SRS resource configuration information, and each SRS resource may include M SRS ports, where N and M are positive integers greater than 0.

The configuration information of the transmission layer quantity may be configuration information of the transmission layer quantity on specific uplink data. For example, the configuration information of the transmission layer quantity is configuration information of the transmission layer quantity about a PUSCH (Physical Uplink Shared Channel); as another example, the configuration information of the transmission layer quantity is configuration information of the transmission layer quantity about a PUCCH (Physical Uplink Control Channel), and the like.

The configuration information of the transmission layer quantity may include the maximum transmission layer quantity of transmission layers allowed to be transmitted by the terminal, the maximum rank quantity, or the maximum reference information port quantity corresponding to data transmission, and the like. The configuration information of the transmission layer quantity may further include a set of the quantities of layers allowed to be transmitted by the terminal, for example, {1} or {2} or {1, 2, 4} or the like.

The configuration information of the transmission layer quantity transmitted by the base station to the terminal may be sent through an RRC (Radio Resource Control) signaling or a MAC (Media Access Control) signaling, or may be transmitted through a physical layer signaling such as DCI (Downlink Control Information).

A time order between the step of transmitting the configuration information of the transmission layer quantity by the base station to the terminal and the step of transmitting the SRS resource configuration information by the base station to the terminal is not limited in the present disclosure, and the configuration of the transmission layer quantity and the SRS resource configuration information are not restricted to be sent by means of the same type of channels or signalings. For example, the base station sends the configuration information of the transmission layer quantity to the terminal through the RRC signaling or the MAC signaling, and then the base station sends the SRS resource configuration information to the terminal through the DCI; or the base station transmits the configuration information of the transmission layer quantity to the terminal through the DCI, and then transmits the SRS resource configuration information to the terminal through another DCI.

Step 102: determining uplink transmission indication information.

In this step, the base station determines the uplink transmission indication information.

In some embodiments of the present disclosure, the uplink transmission indication information may include at least one of target indication information and mapping relationship information.

The target indication information may include at least one of a SRS resource indicator (SRI), a Transmission Rank indicator (TRI), and indication information for a SRS port in the SRS resource. The mapping relationship information may include at least one of following: order information of SRS resources, order information of SRS ports in the SRS resources, mapping relationship information between the SRS resources and reference signal ports, mapping relationship information between the SRS resources and layers, mapping relationship information between the SRS ports in the SRS resources and the reference signal ports, and mapping relationship information between the SRS port in the SRS resource and the layer. The layer may be a layer in uplink data transmission, such as a PUSCH layer, or a PUCCH layer, or may be a codeword in the uplink data transmission, such as a codeword of the PUSCH, or a codeword of the PUCCH, and a codeword may correspond to a plurality of layers. That is, the mapping relationship with layers is not limited to a layer. The reference signal port is an uplink reference signal port, such as a DMRS (Demodulation Reference Signal) port or another demodulation reference signal port.

Optionally, determining the uplink transmission indication information by the base station includes: receiving, by the base station, an SRS signal transmitted by a terminal on an SRS resource; determining the uplink transmission indication information according to the SRS signal.

Step 103: determining a payload corresponding to the uplink transmission indication information according to the SRS resource configuration information and the configuration information of the transmission layer quantity.

In this step, the base station may determine the payload corresponding to the uplink transmission indication information according to the SRS resource configuration information and the configuration information of the transmission layer quantity.

Since the uplink transmission indication information includes at least one of the above plurality of pieces of information, the payload corresponding to the uplink transmission indication information can be understood as the payload corresponding to at least one of the above plurality of pieces of information.

A manner of determining the payload corresponding to the uplink transmission indication information may include a plurality of manners, which will be described in detail in the following embodiments.

Step 104: transmitting the uplink transmission indication information to the terminal by using the payload.

In this step, the base station may transmit the uplink transmission indication information to the terminal by using the determined payload.

The manner of determining the payload corresponding to the uplink transmission indication information will be described in detail in the following plurality of embodiments.

Optionally, determining the payload corresponding to the uplink transmission indication information according to the SRS resource configuration information and the configuration information of the transmission layer quantity includes one of following (i) to (v):

(i) determining the payload corresponding to the uplink transmission indication information according to one of the maximum quantity of antenna ports and the maximum quantity of transmission layers for uplink transmission allowed for the terminal and according to the SRS resource configuration information;

(ii) determining the payload corresponding to the uplink transmission indication information according to the maximum quantity of transmission layers allowed within a maximum uplink transmission capability of the terminal and according to the SRS resource configuration information;

(iii) determining the payload corresponding to the uplink transmission indication information according to the maximum layer quantity in the configuration information of the transmission layer quantity and according to the SRS resource configuration information;

(iv) determining the payload corresponding to the uplink transmission indication information according to one or more elements in a layer quantity set indicated by the configuration information of the transmission layer quantity and according to the SRS resource configuration information;

(v) determining the payload corresponding to the uplink transmission indication information according to the quantity of elements in the layer quantity set indicated by the configuration information of the transmission layer quantity and according to the SRS resource configuration information.

In this embodiment, it is assumed that the base station configures N SRS resources for the terminal, where N is a positive integer greater than 0, and the uplink transmission indication information includes the target indication information, for example, the SRI indication information.

First manner, a first payload for transmitting the target indication information may be determined, by using a bit mapping manner, to be N bits.

For the bit mapping manner, the base station may use N bits to encode all of the SRS resources. If a corresponding bit is 1, then it may be indicated that the base station selects the SRS resource corresponding to the bit; if the corresponding bit is 0, then it may be indicated that the base station does not select the SRS resource corresponding to the bit.

For example, N=4, the base station uses 4 bits to indicate the SRI. If a signaling in which the base station indicates the SRI is 1010, then it means that the base station indicates SRI=0, SRI=2, that is, the base station selects SRS resources labeled "0" and "2". The terminal uses precoding matrices corresponding to the two SRS resources to perform precoding on the DMRS signal and an uplink data signal.

Second manner, $\lceil \log_2(N) \rceil$ bits are used in encoding for each SRS resource, and the base station transmits only a SRS resource numbering value selected by the base station. For example, if the base station selects k SRS resources, the base station transmits the SRS resource indicator information to the terminal by using $k*\lceil \log_2(N) \rceil$ bits, wherein first $\lceil \log_2(N) \rceil$ bits correspond to a SRS resource numbering value, and every $\lceil \log_2(N) \rceil$ bits after the first $\lceil \log_2(N) \rceil$ bits correspond to a SRS resource numbering value.

A first payload for transmitting the target indication information may be determined to be $P*\lceil \log_2 N \rceil$ bits, where P is a positive integer, and the P represents the maximum quantity of antenna ports or the maximum quantity of transmission layers for uplink transmission allowed for the terminal. For example, the total quantity of bits of the SRI may be determined according to the maximum quantity of antenna ports or the quantity of layers allowed for uplink data transmission. Assuming that the maximum quantity of layers allowed for uplink data transmission is P, the total quantity of bits of the SRI may be $P*\lceil \log_2 N \rceil$ bits.

The first payload for transmitting the target indication information is determined to be $L*\lceil \log_2 N \rceil$ bits, where the L is a positive integer, and the L represents the maximum quantity of transmission layers allowed within a maximum uplink transmission capability of the terminal. For example, the total quantity of bits of the SRI may be determined according to the maximum uplink transmission capability of the terminal. In a case that the maximum quantity of uplink transmission layers allowed within the maximum uplink transmission capability of the terminal is L, the total quantity of bits of the SRI is $L*\lceil \log_2 N \rceil$ bits.

The first payload for transmitting the target indication information is determined to be $K*\lceil \log_2 N \rceil$ bits, where K is a positive integer, and the K represents the maximum layer quantity in the configuration information of the transmission layer quantity. For example, the total quantity of bits of the SRI may be determined according to the configuration information of the transmission layer quantity transmitted from the base station to the terminal. In a case that the configuration information of the transmission layer quantity sent by the base station to the terminal is an indication signaling indicating the maximum layer quantity and the indicated maximum layer quantity is K, the total quantity of bits of the SRI may be $K*\lceil\log_2 N\rceil$ bits.

The first payload for transmitting the target indication information is determined to be $Z*\lceil\log_2 N\rceil$ bits, where Z is a positive integer, the Z represents the maximum value of elements within the layer quantity set indicated by the configuration information of the transmission layer quantity.

The first payload for transmitting the target indication information is determined to be $Q*\lceil\log_2 N\rceil$ bit, where Q is a positive integer, and the Q represents the quantity of elements in the layer quantity set indicated by the configuration information of the transmission layer quantity. For example, in a case that the configuration information of the transmission layer quantity sent by the base station to the terminal is a set of transmission layer quantities allowed by the base station and there are a total of Q elements in the set, the total quantity of bits of the SRI may be $Q*\lceil\log_2 N\rceil$ bits.

Third manner, the first payload for transmitting the target indication information may be determined according to the possible quantity of possibly selected SRS resources.

For example, the quantity of combinations corresponding to n SRS resources selected by the base station from N SRS resources is $C_N^m$, and the first payload for transmitting the target indication information is determined to be $$\left\lceil \log_2\left(\sum_{n=1}^{N} C_N^n\right) \right\rceil$$

bits, where $C_N^m$ is the quantity of combinations corresponding to n SRS resources selected by the base station from N SRS resources, and n is a positive integer less than or equal to N.

For example, the total quantity of bits of the SRI may be a joint encoding of a combination of all possible SRS resource numbering values of the SRS resources configured by the base station. Considering all possible cases, for example, only SRS resource #0, only SRS resource #1, SRS resources #1, 3, SRS resources #1, 2, 4, and the like. In a case that the terminal is configured with the N SRS resources, and the quantity of all possible combinations of the SRS resources is $$\sum_{n=1}^{N} C_N^n,$$

then the quantity of encoded bits of the SRS resource indicator information is $$\left\lceil \log_2\left(\sum_{n=1}^{N} C_N^n\right) \right\rceil.$$

The first payload for transmitting the target indication information is determined to be $$\left\lceil \log_2\left(\sum_{n=1}^{P} C_N^n\right) \right\rceil$$

bits, where P is a positive integer, and the P indicates the maximum quantity of antenna ports or the maximum quantity of transmission layers allowed for the terminal.

For example, the total quantity of bits of the SRI may be a joint encoding of all possible combinations of SRS resource numbering values from a SRS resource to SRS resources, the quantity of which is the maximum quantity of antenna ports or the maximum quantity of layers allowed for the uplink data transmission, selected by the base station from configured SRS resources. Assuming that the maximum quantity of layers allowed for the uplink data transmission is P, the total quantity of bits of the SRI may be $$\left\lceil \log_2\left(\sum_{n=1}^{P} C_N^n\right) \right\rceil$$

bits.

The first payload for transmitting the target indication information is $$\left\lceil \log_2\left(\sum_{n=1}^{L} C_N^n\right) \right\rceil$$

bits, where L is a positive integer, and the L represents the maximum quantity of transmission layers allowed within the maximum uplink transmission capability of the terminal.

For example, the total quantity of bits of the SRI may be a joint encoding of all possible combinations of SRS resource numbering values from a SRS resource to SRS resources, the quantity of which is the maximum quantity of uplink transmission layers allowed within the maximum uplink transmission capability of the terminal, selected by the base station from the configured SRS resources. Assuming that the maximum quantity of uplink transmission layers allowed within the maximum uplink transmission capability of the terminal is L, the total quantity of bits of the SRI may be $$\left\lceil \log_2\left(\sum_{n=1}^{L} C_N^n\right) \right\rceil$$

bits.

The first payload for transmitting the target indication information is $$\left\lceil \log_2\left(\sum_{n=1}^{K} C_N^n\right) \right\rceil$$

bits, where K is a positive integer, and the K represents the maximum quantity of layers in the configuration information of the transmission layer quantity.

For example, the total quantity of bits of the SRI may be a joint encoding of all possible combinations of SRS resource numbering values from a SRS resource to SRR resources, the quantity of which is the maximum quantity of layers allowed and configured by the base station for the terminal, selected by the base station from the configured SRS resources. The configuration information of the transmission layer quantity sent by the base station to the terminal is the indication signaling indicating the maximum layer quantity, and the indicated maximum layer quantity is K, and the total quantity of bits of the SRI may be $$\left\lceil \log_2\left(\sum_{n=1}^{K} C_N^n\right) \right\rceil$$

bits.

The first payload for transmitting the target indication information is $$\left\lceil \log_2\left(\sum_{n \in Q} C_N^n\right) \right\rceil$$

bits, where Q is a positive integer, and the Q represents the quantity of elements in a layer quantity set indicated by the configuration information of the transmission layer quantity.

For example, in a case that the configuration information of the transmission layer quantity sent by the base station to the terminal is a set of transmission layer quantities allowed by the base station and the set is Q, the total quantity of bits of the SRI may be $$\left\lceil \log_2\left(\sum_{n \in Q} C_N^n\right) \right\rceil$$

bits.

Fourth manner, the first payload of the target indication information may be designated as a fixed payload. For example, it is determined that the first payload for transmitting the target indication information is Y bits, where Y is a positive integer greater than or equal to the first payload determined in any one of the above first to the third.

For example, the total quantity of bits of the SRI may be the specified quantity of bits. For example, a Technical Specification specifies the total quantity of bits of the SRI. For example, the Technical Specification may specify that the total quantity of bits of the SRI is 11 or 12, or other numerical values. The SRI is encoded by using the quantity of bits specified by the Technical Specification.

In this embodiment, the target indication information and the mapping relationship information may be independently encoded.

The mapping relationship information includes at least one of following: order information of SRS resources, order information of SRS ports in the SRS resources, mapping relationship information between the SRS resources and reference signal ports, mapping relationship information between the SRS resources and layers, mapping relationship information between the SRS ports in the SRS resources and the reference signal ports, and mapping relationship information between the SRS port in the SRS resource and the layer.

The mapping relationship information may include spatial QCL (Quasi co-location) information between SRS resources and DMRS ports, or spatial QCL information between a SRS resource and a PUSCH data stream. In this embodiment, only the spatial QCL information between the SRS resource and the DMRS port is described as an example, and all of the technical solutions are applicable to a case of indicating the spatial QCL information between the SRS resource and the PUSCH data stream.

The mapping relationship information refers to information for determining mapping relationship. Spatial QCL information between a signal A and a signal B is information that determines that the signal A and the signal B have a spatial QCL. Here, the spatial QCL between the signal A and the signal B correspond to an assumption that the signal A and the signal B may have the same spatial characteristics. For example, the spatial QCL between the signal A and the signal B may mean that the signal A and the signal B have the same transmission precoding matrix/beam or that the signal A and the signal B have the same reception precoding matrix/beam. For example, a spatial QCL between a SRS resource and a DMRS port means that all SRS ports in the SRS resource and the DMRS port use the same transmission precoding matrix/beam. A spatial QCL between a SRS port and a PUSCH data stream means that the PUSCH data stream is transmitted by using the same precoding matrix/beam as that of the SRS port.

First manner, the base station and the terminal make an agreement (directly specified in a Technical Specification) or the base station sends, to the terminal through signaling, spatial QCL relationship between a SRS resource and a DMRS port configured by the base station. Taking, as an example, a case in which the base station configures N SRS resources for the terminal.

The relationship may be the QCL relationship between a SRS resource and a DMRS port configured by the base station.

The relationship may be in a form of a table, for example, as follows:

| | |
|---|---|
| SRI = 0 | DMRS port X1 |
| SRI = 1 | DMRS port X2 |
| . . . | . . . |
| SRI = N | DMRS port XN |

Xk represents a numbering value of a DMRS port, for example, 0, 1, 2, 3. Assuming that a maximum of W DMRS ports are allowed, the value of Xk can be an integer from 0 to W−1. For example, a typical table is:

| | |
|---|---|
| SRI = 0 | DMRS port 0 |
| SRI = 1 | DMRS port 1 |
| SRI = 2 | DMRS port 2 |
| SRI = 3 | DMRS port 3 |

The relationship can also be described in a language. For example, a numbering value of a SRS resource configured by the base station corresponds to a numbering value of a DMRS port. The correspondence may be a one-to-one correspondence. That is, a numbering value of SRI corresponds to a DMRS port quantity in a one-to-one manner, and a SRS resource and a DMRS port having the same numbering value have the spatial QCL relationship therebetween.

In this manner, after the base station determines the SRI, there is no need for the base station to transmit additional spatial QCL information between SRS resources and DMRS ports.

However, it is noted that if the spatial QCL relationship table between the SRS resources and the DMRS port is sent by the base station through signaling, the base station may need to update the relationship table in a case of re-configuring the SRS resource for the terminal.

Second manner, the relationship may be spatial QCL relationship between a SRS resource selected by the base station and a DMRS port. The base station and the terminal make an agreement (specified in a Technical Specification) that numbering values of SRS resources selected by the base station have certain mapping relationship with numbering values of the DMRS ports, and the corresponding SRS resources and the DMRS ports have spatial QCL relationship. For example, the base station and the terminal make an agreement (specified in a Technical Specification) that the numbering values of SRS resources selected by the base station correspond to the numbering values of the DMRS ports in an order from small to large, and the corresponding SRS resources and the DMRS ports have the spatial QCL relationship. For example, SRIs corresponding to the SRS resources selected by the base station are 0 and 3, respectively. The SRS resources and the DMRS ports have following QCL relationship:

| | |
|---|---|
| SRI = 0 | DMRS port 0 |
| SRI = 3 | DMRS port 1 |

Because a spatial rule is agree upon, the base station selects the SRS resources, determines the SRIs to be transmitted to the terminal, and only two SRI, SRI=0 and SRI=3, needed to be sent. There is no need to send the QCL relationship between the SRS resources selected by the base station and the DMRS ports.

Third manner, the relationship may be the spatial QCL relationship between the SRS resources selected by the base station and the DMRS ports. The base station needs to send, to the terminal, an order of the selected SRS resources, that is, spatial QCL information between SRS resources and DMRS ports in the SRS indication information is SRS resource order information. The base station and the terminal make an agreement (specified in a Technical Specification) that numbering values of the SRS resources selected by the base station arranged in the order in which the selected SRS resources are transmitted to the terminal by the base station have certain correspondence relationship with the numbering values of the DMRS ports. For example, the base station and the terminal make an agreement (specified in a Technical Specification) that the numbering values of the SRS resources selected by the base station arranged in the order in which the selected SRS resources are transmitted to the terminal by the base station correspond to the numbering values of the DMRS ports in an order from small to large. The corresponding SRS resources and the DMRS ports have spatial QCL relationship. For example, the SRIs corresponding to the SRS resources selected by the base station are 0 and 3, respectively, the SRS resources and the DMRS ports may have following two kinds of spatial QCL relationship:

| | |
|---|---|
| SRI = 0 | DMRS port 0 |
| SRI = 3 | DMRS port 1 |
| or, | |
| SRI = 3 | DMRS port 0 |
| SRI = 0 | DMRS port 1 |

The base station needs to transmit, to the terminal, whether the order of the selected SRS resources is (SRI=0, SRI=3) or (SRI=3, SRI=0). That is, the spatial QCL information between the SRS resources and the DMRS ports in the SRS indication information is the SRS resource order information.

Fourth manner, the mapping relationship information (for example, the SRS resource order information) can be independently encoded.

A third payload for transmitting the mapping relationship information is determined to be $\lceil \log_2(A_X^X) \rceil$ bits, where $A_X^X$ represents the permutation quantity of all permutations of X elements permuted in an arbitrary order, and the X is a positive integer.

For example, the quantity of bits required for encoding the SRS resource order information may be determined according to the quantity of SRS resources selected by the base station. If the quantity of SRS resources selected by the base station is X, then the quantity of bits for encoding the SRS resource order is $\lceil \log_2(A_X^X) \rceil$ bits, in which $A_X^X$ represents the quantity of all possible permutations of the X elements permuted in an arbitrary order.

The third payload for transmitting the mapping relationship information is determined to be $\lceil \log_2(A_P^P) \rceil$ bits, where P is a positive integer, and the P indicates the maximum quantity of antenna ports or the maximum quantity of transmission layers allowed for the terminal.

For example, the quantity of bits required for encoding the SRS resource order information may be determined according to the maximum quantity of antenna ports or the quantity of layers allowed for uplink data transmission. Assuming that the maximum quantity of layers allowed for uplink data transmission is P, then the quantity of bits of encoding the SRS resource order is $\lceil \log_2(A_P^P) \rceil$ bits.

The third payload for transmitting the mapping relationship information is determined to be $\lceil \log_2(A_L^L) \rceil$ bits, where L is a positive integer, and the L represents the maximum quantity of transmission layers allowed within the maximum uplink transmission capability of the terminal.

For example, the quantity of bits required for encoding the SRS resource order information may be determined according to the maximum uplink transmission capability of the terminal. Assuming that the maximum quantity of uplink transmission layers allowed within the maximum uplink transmission capability of the terminal is L, then the quantity of bits of encoding the SRS resource order is $\lceil \log_2(A_L^L) \rceil$ bits.

The third payload for transmitting the mapping relationship information is $\lceil \log_2(A_K^K) \rceil$ bits, where K is a positive integer, and the K represents the maximum quantity of layers in the configuration information of the transmission layer quantity.

For example, in a case that the configuration information of the transmission layer quantity sent by the base station to the terminal is the indication signaling indicating the maximum layer quantity and the indicated maximum layer quantity is K, the quantity of bits of encoding the SRS resource order is $\lceil \log_2(A_K^K) \rceil$ bits, where $A_X^X$ represents the quantity of all possible permutations of the X elements permuted in an arbitrary order.

The third payload for transmitting the mapping relationship information is determined to $\lceil \log_2(A_{Q_{max}}^{Q_{max}}) \rceil$ bits, where Q is a positive integer, and the Q represents the quantity of elements in the layer quantity set indicated by the configuration information of the transmission layer quantity.

For example, in a case that the configuration information of the transmission layer quantity sent by the base station to the terminal is a set of transmission layer quantities allowed by the base station, and the maximum value in the set is $Q_{max}$, then the quantity of bits of encoding the SRS resource order is $\lceil \log_2(A_{Q_{max}}^{Q_{max}}) \rceil$ bits.

Fifth manner, this manner is a combination of previous two manners.

The base station sends a manner-indication signalling to the terminal, the manner-indication signaling is configured to indicate which manner is used to determine QCL relationship between the SRS resources selected by the base station and the DMRS ports.

For example, the base station sends a 1-bit signaling to the terminal, the signaling includes 2 states, one state represents that the second manner is used, and another state represents that the third manner is used. The signaling may be a static signaling or a semi-static signaling.

Sixth manner, the target indication information and the mapping relationship information may be jointly encoded. For example, the SRI and the spatial QCL information between the SRS resources and the DMRS ports may be jointly encoded.

A joint coding manner is to determine bits used by the SRI and bits used by the spatial QCL information between the SRS resources and the DMRS ports, and then splice the bits used by the SRI and the bits used by the spatial QCL information together for performing the joint coding. The bits used by the SRI and the bits used by the spatial QCL information between the SRS resources and the DMRS ports may be determined in the same manner as that in the independent encoding method described above. Assuming that the quantity of bits required for the SRI is U, and the quantity of bits required for the spatial QCL information between the SRS resources and the DMRS ports is V, then the quantity of bits required for the joint coding is U+V.

A joint coding manner is to determine the quantity of possible values of the joint coding according to the quantity of possible values of the SRI and the quantity of possible values of the spatial QCL information between the SRS resources and the DMRS ports, and then determine the total quantity of bits for the joint coding. The quantity of possible values of the SRI and the quantity of possible values of the spatial QCL information between the SRS resources and the DMRS ports can be determined in the manner described above. Assuming that the quantity of possible values of the SRI is U, the quantity of possible values of the spatial QCL information between the SRS resources and the DMRS ports is V, then the quantity of possible values of the joint coding is U×V, and the quantity of encoded bits is $\lceil \log_2(UV) \rceil$.

A joint coding manner is that the spatial QCL information between the SRS resources and the DMRS ports in the SRS indication information is the SRS resource order information. The base station and the terminal make an agreement (specified in a Technical Specification) that numbering values of SRS resources selected by the base station correspond to numbering values of the DMRS ports in the order in which the selected SRS resources are transmitted to the terminal by the base station, and the SRS resources and the DMRS ports corresponding to the SRS resources have the spatial QCL relationship. The SRS resource order information is jointly transmitted with the SRI by using the quantity of bits determined based on the quantity of bits of the SRI. An order for the SRI corresponding to every $\lceil \log_2(N) \rceil$ bits determines the order of the SRS resources. For example, provided are a total of 3 $\lceil \log_2(N) \rceil$ bits, first $\lceil \log_2(N) \rceil$ bits indicates SRI=1, middle $\lceil \log_2(N) \rceil$ bits indicate SRI=3, and last $\lceil \log_2(N) \rceil$ bits indicates SRI=0. SRI selected by the base station is indicated to be SRI=0, SRI=1, and SRI=3, and the SRS resource order information is {SRI=1, SRI=3, SRI=0}.

A joint coding manner is that the quantity of combinations of the SRS resource order information combined with the SRI is the product of all possible quantities of values of the SRI selected by the base station and the possible quantities of permutations of the values of the SRI. That is: the third payload for transmitting the mapping relationship information is determined to be $\lceil \log_2(C_N^X * A_X^X) \rceil$ bits, where $C_N^X$ represents the quantity of combinations of X elements selected from N elements, the $A_X^X$ represents the quantity of permutations of X elements permutated in an arbitrary order, wherein the X is a positive integer; or, the third payload for transmitting the mapping relationship information is determined to be as $\lceil \log_2(C_P^X * A_X^X) \rceil$ bits, where P is a positive integer, P represents the maximum quantity of antenna ports or the maximum quantity of transmission layers allowed for the terminal; or, the third payload for transmitting the mapping relationship information is determined to be $\lceil \log_2(C_L^X * A_X^X) \rceil$ bits, where L is a positive integer, L represents the maximum quantity of transmission layers allowed within the maximum uplink transmission capability of the terminal; or, the third payload for transmitting the mapping relationship information is determined to be $\lceil \log_2(C_L^X * A_X^X) \rceil$ bits, where K is a positive integer, K represents the maximum quantity of layers in the configuration information of the transmission layer quantity; or, the third payload for transmitting the mapping relationship information is determined to be $\lceil \log_2(C_{Q_{max}}^X * A_X^X) \rceil$ bits, where Q is a positive integer, and the Q represents the quantity of elements in the layer quantity set indicated by the configuration information of the transmission layer quantity.

Optionally, determining the payload corresponding to the uplink transmission indication information according to the SRS resource configuration information and the configuration information of the transmission layer quantity includes: measuring, by the base station, an SRS signal and selecting a TRI resource and/or a SRS resource and/or an SRS port according to a result of the measurement; wherein the payload corresponding to the uplink transmission indication information is a function of the quantity of TRI and/or the quantity of SRS ports and/or the quantity of SRS resources selected by the base station and the SRS resource configuration information.

In this embodiment, the base station configures a SRS resource for the terminal, the SRS resource includes a plurality of SRS ports. Optionally, the base station configures a plurality of SRS resources for the terminal, and each of the SRS resources includes a plurality of SRS ports. The base station transmits the configuration information of the transmission layer quantity to the terminal. The configuration information of the transmission layer quantity may be the maximum transmission layer quantity of the terminal allowed by the base station, or the maximum rank quantity, or the maximum DMRS port quantity corresponding to data transmission. An indication signaling of the transmission layer quantity may be a set of quantities of transmission layers allowed by the base station, for example, {1}, {2}, {1, 2, 4}, and the like.

The base station determines TRI (Transmission Rank Indicator) of the quantity of transmission layers for uplink data transmission of the terminal according to the SRS resources transmitted by the terminal. The base station transmits the following information to the terminal: the SRI and/or the TRI, and/or the QCL information between the SRS ports and the DMRS ports, or QCL information between the SRS ports and a PUSCH layer/stream/codeword.

The TRI and the QCL information between the SRS ports and the DMRS ports may be independently encoded or jointly encoded. The terminal may determine the quantity of layers or layers for uplink data transmission according to the TRI.

It is assumed that the base station configures an SRS resource for the terminal, or the base station indicates an SRS resource through the SRI, the SRS resource includes M SRS ports, and M is a positive integer greater than 1, then TRI<=M, and a payload and a coding mode of the TRI can be following manners.

First manner, the quantity of bits of the TRI is determined by M. For example, the quantity of possible values of the TRI corresponding to a k-th SRS resource is a function of the quantity M of antenna ports. For example, the value of the TRI is fixed to be equal to the quantity of configured antenna ports, that is, the quantity of possible values of the TRI is 1, and the quantity of bits corresponding to the TRI is 1 or 0 ("0" represents that the TRI is not sent, for example, the base station and the terminal make an agreement that the value of the TRI is fixed to be equal to the quantity of configured antenna ports). For example, if transmission of 1, 2, ..., M data layers is allowed to be mapped to M antenna ports, then the quantity of possible values of the TRI is equal to the quantity of antenna ports M, and the quantity of bits of the TRI is $\lceil \log_2 M \rceil$.

Second manner, it is determined that a sixth payload for transmitting the TRI is $\lceil \log_2(\max_k(M_k)) \rceil$ bits, where k is a positive integer, the $M_k$ is the quantity of ports of the k-th SRS resource, and the $\max_k(M_k)$ is the maximum quantity of ports of the SRS resource.

Third manner, it is determined that the sixth payload for transmitting the TRI is $\lceil \log_2 P \rceil$ bits, where P is a positive integer, and the P indicates the maximum quantity of antenna ports or the maximum quantity of transmission layers allowed for the terminal.

Fourth manner, it is determined that the sixth payload for transmitting the TRI is $\lceil \log_2(L) \rceil$ bits, where L is a positive integer, and the L represents the maximum quantity of transmission layers allowed within the maximum uplink transmission capability of the terminal.

Fifth manner, it is determined that the sixth payload for transmitting the TRI is $\lceil \log_2 K \rceil$ bits, where K is a positive integer, and the K represents the maximum quantity of layers in the configuration information of the transmission layer quantity.

Sixth manner, it is determined that the sixth payload for transmitting the TRI is $Q*\lceil \log_2 M \rceil$ bit, where Q is a positive integer, and the Q indicates the quantity of elements in the layer quantity set indicated by the configuration information of the transmission layer quantity.

In this embodiment, the TRI and the QCL information between SRS ports and the DMRS ports may be encoded independently.

The mapping relationship information includes at least one of following: order information of SRS resources, order information of SRS ports in the SRS resources, mapping relationship information between the SRS resources and reference signal ports, mapping relationship information between the SRS resources and layers, mapping relationship information between the SRS ports in the SRS resources and the reference signal ports, and mapping relationship information between the SRS port in the SRS resource and the layer.

The mapping relationship information may include spatial QCL (Quasi co-location) information between SRS resources and DMRS ports, or spatial QCL information between a SRS resource and a PUSCH data stream. In this embodiment, only the spatial QCL information between the SRS resources and the DMRS ports is described as an example, and all of the technical solutions are applicable to a case of indicating the spatial QCL information between the SRS resource and the PUSCH data stream.

First manner, the base station and the terminal make an agreement (specified in a Technical Specification) that there is fixed mapping relationship between the TRI and the SRS port. For example, TRI=1 corresponds to a SRS port 0; TRI=2 corresponds to SRS ports 0, 1; TRI=3 corresponds to SRS ports 0, 1, 2, ..... There is certain mapping relationship between numbering values of the SRS ports corresponding to the TRI and numbering values of DMRS ports, and there is QCL relationship between the SRS ports and corresponding DMRS ports. In this manner, the base station does not need to transmit QCL-related information of the SRS ports and the DMRS ports after the TRI is determined.

Second manner, after the TRI is determined, the base station needs to transmit SRS port selection information selected by the base station. Assuming that TRI=R, in such a case the QCL information between the SRS ports and the DMRS ports also includes the SRS port selection information. The quantity of bits selected for the SRS port may be the aforementioned bit mapping manner. Each SRS resource may also be encoded by using $\lceil \log_2 M \rceil$ bits, and the base station may transmit the SRS port selection information to the terminal by using $R*\lceil \log_2 M \rceil$ bits. The quantity of bits of the SRS port selection information may also be a joint encoding of combinations of numbering values of all possible SRS ports, among configured N SRS ports, for which the base station selects TRI=R SRS resources. The total quantity of bits of the SRS port selection information may be $\lceil \log_2 C_M^R \rceil$ bits. The quantity of bits of the SRS port selection information may be a predetermined quantity of bits.

One way is that the base station and the terminal make an agreement (specified in a Technical Specification) that there is certain mapping relationship between numbering values of the SRS ports selected by the base station and numbering values of the DMRS ports, and there is the QCL relationship between the SRS ports and the corresponding DMRS ports. For example, the base station and the terminal make an agreement (specified in a Technical Specification) that the numbering values of the SRS ports selected by the base station correspond to the numbering values of the DMRS ports in an order from small to large, and the SRS ports and the corresponding DMRS ports have the spatial QCL relationship. For example, SRIs corresponding to the SRS ports selected by the base station are 0 and 3, respectively. The SRS ports and the DMRS ports have following QCL relationship:

| | |
|---|---|
| SRI = 0 | DMRS port 0 |
| SRI = 3 | DMRS port 1 |

After the base station transmits the SRS port selection information, the terminal determines the TRI according to the SRS port selection information, and the base station may not transmit the TRI to the terminal.

Third manner, after the base station determines the TRI, the base station needs to transmit the spatial QCL relationship between the SRS ports selected by the base station and the DMRS ports in addition to transmitting the SRS port selection information selected by the base station. The base station needs to transmit the order of the selected SRS ports to the terminal, that is, the QCL information between the SRS ports and the DMRS ports in SRS indication information is the SRS port order information. The base station and the terminal make an agreement (specified in a Technical Specification) that numbering values of the SRS ports selected by the base station arranged in the order in which the selected SRS ports are transmitted to the terminal by the base station have certain correspondence relationship with the numbering values of the DMRS ports. For example, the base station and the terminal make an agreement (specified in a Technical Specification) that the numbering values of the SRS ports selected by the base station arranged in the order in which the selected SRS ports are transmitted to the terminal by the base station correspond to the numbering values of the DMRS ports in an order from small to large. The SRS ports and the corresponding DMRS ports have spatial QCL relationship. For example, the SRS ports selected by the base station are 0 and 3, the SRS ports and the DMRS ports may have following two kinds of spatial QCL relationship:

| | |
|---|---|
| SRS port 0 | DMRS port 0 |
| SRS port 3 | DMRS port 1 |
| or, | |
| SRS port 3 | DMRS port 0 |
| SRS port 0 | DMRS port 1 |

The base station needs to transmit to the terminal whether the order of the selected SRS ports is (SRS port 0, SRS port 3) or (SRS port 3, SRS port 0). That is, the spatial QCL information between the SRS ports and the DMRS ports in the SRS indication information is SRS port order information.

The SRS port order information may be independently encoded.

The quantity of bits required for encoding the SRS port order information may be determined according to the TRI. If TRI=R, then the quantity of bits of encoding an SRS port order is $\log_2(A_R^R)$ bits, in which $A_R^R$ represents the quantity of all possible permutations of X elements permuted in an arbitrary order.

The SRS port order information may be transmitted together with the SRS port selection information. For example, the base station transmits joint information to the terminal using $R*\lceil\log_2 M\rceil$ bits. The content of every $\lceil\log_2 M\rceil$ bits corresponds to a SRS port, and the order of the $R*\lceil\log_2 M\rceil$ bits corresponds to the order of SRS ports.

Fourth manner, the base station sends a manner indication signalling to the terminal, the manner indication signaling is used to indicate which of the above manners is used to determine the QCL relationship between the SRS ports selected by the base station and the DMRS ports. The signaling may indicate two or three of the above manners.

For example, the base station sends a 1-bit signaling to the terminal, the signaling includes 2 states, one state represents that the second manner is used, and another state representation that the third manner is used. The signaling may be a static signaling or a semi-static signaling.

In this embodiment, the TRI and the spatial QCL information between the SRS ports and the DMRS port may be jointly encoded.

A joint coding manner is to determine bits used by the TRI and bits used by the spatial QCL information between the SRS ports and the DMRS ports, and then splice the bits used by the TRI and the bits used by the spatial QCL information together for performing the joint coding. The bits used by the TRI and the bits used by the spatial QCL information between the SRS ports and the DMRS ports may be determined in the same manner as that in the independent encoding method described above. Assuming that the quantity of bits required for the TRI is U, and the quantity of bits required for the spatial QCL information between the SRS ports and the DMRS ports is V, then the quantity of bits required for the joint coding is U+V.

A joint coding manner is to determine the quantity of possible values of the joint coding according to the quantity of possible values of the TRI and the quantity of possible values of the spatial QCL information between the SRS ports and the DMRS ports, and then determine the total quantity of bits for the joint coding. The quantity of possible values of the TRI and the quantity of possible values of the spatial QCL information between the SRS ports and the DMRS ports can be determined in the manner described above. Assuming that the quantity of possible values of the TRI is U, the quantity of possible values of the spatial QCL information between the SRS ports and the DMRS ports is V, then the quantity of possible values of the joint coding is U×V, and the quantity of encoded bits is $\log_2$ (UV).

A joint coding manner is that the spatial QCL information between the SRS ports and the DMRS ports in the SRS indication information is the SRS resource order information. The base station and the terminal make an agreement (specified in a Technical Specification) that numbering values of SRS ports selected by the base station correspond to numbering values of the DMRS ports in the order in which the selected SRS resources are transmitted to the terminal by the base station. For example, the base station and the terminal make an agreement (specified in a Technical Specification) that numbering values of SRS resources selected by the base station arranged in the order in which the selected SRS resources are transmitted to the terminal by the base station correspond to numbering values of the DMRS ports in an order from small to large. The SRS resources and the DMRS ports corresponding to the SRS resources have the spatial QCL relationship. The SRS resource order information is jointly transmitted with the SRS selection information by the above mentioned manner for determining the quantity of bits of the SRI. An order of the SRS corresponding to every $\lceil\log_2 M\rceil$ bits determines the order of the SRS ports. For example, provided are a total of $3\lceil\log_2 M\rceil$ bits, first $\lceil\log_2 M\rceil$ bits indicates SRS port=1, middle $\lceil\log_2 M\rceil$ bits indicate SRS ports=3, and last $\lceil\log_2 M\rceil$ bits indicate SRS port=0. The SRS port selected by the base station is indicated to be a SRS port 0, a SRS port 1, and a SRS port 3, and the SRS resource order information is {SRS port=1, SRS port=3, SRS port=0}. The corresponding TRI is TRI=3. As another example, if the terminal detects the SRS port 0 and the SRS port 2, then the TRI=2.

A joint coding manner is that the quantity of possible values corresponding to joint encoding of the SRS port order information and the TRI is the product of all possible quantities of SRS ports selected by the base station and the possible quantities of permutations of the SRS ports. That is: the quantity of combinations of the SRS port order information and the TRI may be the quantity of all possible permutations of the numbering values of SRS ports selected by the base station from configured SRS ports, wherein the quantity of the SRS ports selected by the base station is from 1 to the maximum quantity of antenna ports or the maximum quantity of layers allowed by uplink data transmission. Assuming that the maximum quantity of antenna ports allowed by the uplink data transmission is P, then the quantity of combinations of the SRS port order information and the SRI is $$\sum_{m=1}^{P} A_M^m,$$

and the quantity of bits required for the joint encoding is $$\left\lceil \log_2\left(\sum_{m=1}^{F} A_M^m\right) \right\rceil$$

bits.

The quantity of combinations of the SRS port order information and the TRI is the quantity of all possible permutations of the numbering values of SRS ports selected by the base station from the configured SRS ports, wherein the quantity of the SRS ports selected by the base station is from 1 to the maximum quantity of uplink transmission layers allowed within uplink transmission capability of the terminal. Assuming that the maximum quantity of uplink transmission layers allowed within the uplink transmission capability of the terminal is L, then the quantity of combinations of the SRS port order information and the SRI is $$\sum_{m=1}^{L} A_M^m,$$

and the quantity of bits required for the joint encoding is $$\left\lceil \log_2\left(\sum_{m=1}^{L} A_M^m\right) \right\rceil$$

bits.

The quantity of combinations of the SRS port order information and the TRI is the quantity of all possible permutations of the numbering values of SRS ports selected by the base station from configured SRS ports, wherein the quantity of the SRS ports selected by the base station is from 1 to the maximum quantity of allowed layers configured by the base station for the terminal. The configuration information of the transmission layer quantity sent to the terminal by the base station is an indication signaling of the maximum quantity of layers, and the indicated maximum quantity of layers is K, then the quantity of combinations of the SRS port order information and the SRI is $$\sum_{m=1}^{K} A_M^m,$$

and the quantity of bits required for the joint encoding is $$\left\lceil \log_2\left(\sum_{m=1}^{K} A_M^m\right) \right\rceil$$

bits.

In a case that the configuration information of the transmission layer quantity sent by the base station to the terminal is a set of quantities of transmission layers allowed by the base station and the set is Q, the quantity of combinations of the SRS port order information and the TRI is $$\sum_{m \in Q} A_M^m,$$

then the quantity of bits required for the joint coding is $$\left\lceil \log_2\left(\sum_{m \in Q} A_M^m\right) \right\rceil.$$

Similarly, a manner of the joint encoding may be a combination of two or more of the above joint encoding manners. The base station sends a manner indication signaling to the terminal, the manner indication signaling is used to indicate which manner is used for the jointly encoding.

For example, the base station sends a 1-bit signaling to the terminal, the signaling includes 2 states, one state represents a manner and the other state represents another manner. The signaling may be a static signaling or a semi-static signaling.

There is also a payload determination method for the joint coding in which the base station and the terminal make an agreement on the total payload of the TRI and the QCL information between the SRS and the DMRS ports.

Optionally, whether the base station and the terminal make an agreement on the mapping relationship (for example, the base station and the terminal make an agreement on the mapping relationship between uplink transmission indication information and reference signal ports in advance; or, the base station and the terminal make an agreement in advance on the mapping relation between the uplink transmission indication information and a layer or specify in advance in a protocol mapping relationship between the uplink transmission indication information and reference signal ports or mapping relationship between the uplink transmission indication information and layers) or the terminal indicates the mapping relationship to the base station, the base station determines the mapping relationship, and determines an uplink reception manner according to the mapping relationship. For example, the uplink transmission indication information includes SRS resource indicator information, the mapping relationship is a mapping relationship between SRS resources and reference signal ports, and the reference signal ports are DMRS ports. The mapping relationship between the SRS resources and the reference signal ports is the spatial QCL relationship, then in a case that the base station receives the DMRS, the base station receives the DMRS on the DMRS port using the same reception beam as that used in a case of receiving SRS transmission corresponding to the SRS resource indicated by the uplink transmission indication information. As another example, the uplink transmission indication information includes SRS resource indicator information, and the mapping relationship is mapping relationship between SRS resources and layers. In a case that the base station receives uplink data, the base station receives the uplink data at the layer using the same reception beam as that used in a case of receiving SRS transmission corresponding to the indicated SRS resource.

Optionally, the uplink data is data transmitted on a PUSCH, and the layer in the mapping relationship is a layer of the PUSCH. Optionally, the uplink data is data transmitted on the PUCCH, and the layer in the mapping relationship is a layer of the PUCCH. Optionally, the uplink data is the DMRS of the PUSCH. Optionally, the uplink data is the DMRS of the PUCCH. Of course, it should be understood that the uplink data may also be a combination of the above listed data, or other uplink data, all of which are within the protection scope of the present disclosure. For example, the uplink data is data transmitted on the PUSCH and data transmitted on the DMRS of the PUSCH, and the like.

Optionally, determining the payload corresponding to the uplink transmission indication information according to the SRS resource configuration information and the configuration information of the transmission layer quantity further includes: in a case that determining that the payload corresponding to the uplink transmission indication information includes at least two determination manners according to the SRS resource configuration information and the configuration information of the transmission layer quantity, the base station sends payload determination manner indication information to the terminal; wherein the payload determination manner indication information is instruction information indicating a determination manner for determining the payload corresponding to the uplink transmission indication information according to the SRS resource configuration information and the configuration information of the transmission layer quantity.

The joint encoding manner may be a combination of the above two or more joint encoding manners. The base station sends a manner indication signaling to the terminal, the manner indication signaling is used to indicate which manner is sued for the jointly encoding.

For example, the base station sends a 1-bit signaling to the terminal, the signaling includes 2 states, one state represents a manner, and another state represents another manner. The signaling may be a static signaling or a semi-static signaling.

In summary, some embodiments of the present disclosure can reduce an overhead or a payload for uplink transmission in a NR system by sending SRS resource configuration information and configuration information of the transmission layer quantity to determine a payload corresponding to uplink transmission indication information.

Figure 2:
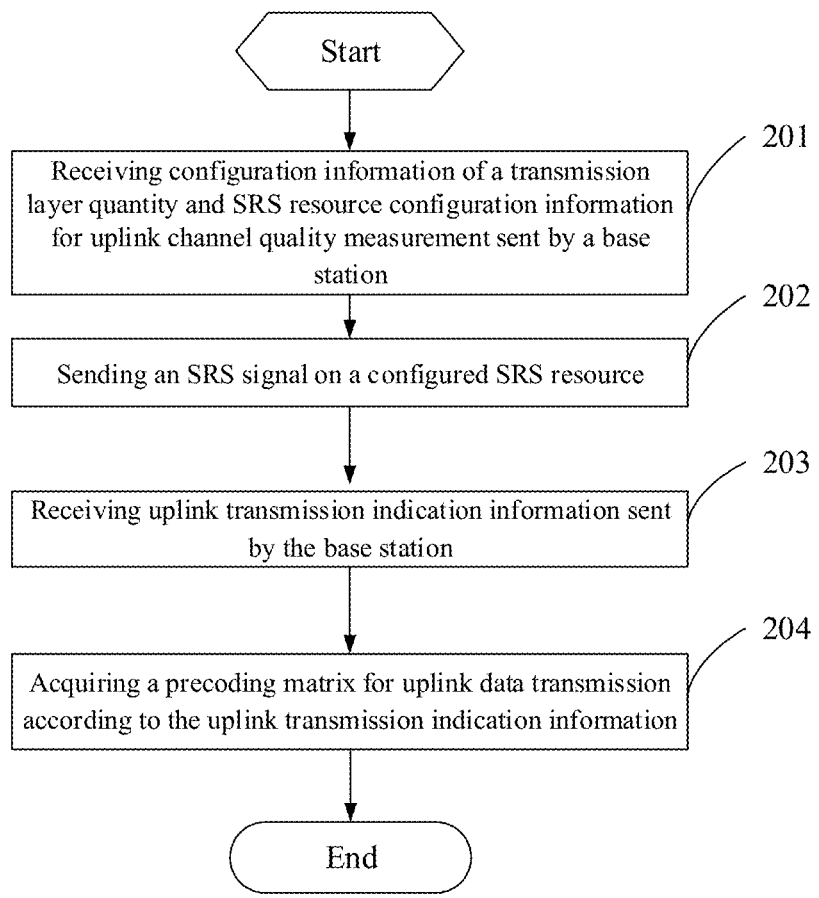
FIG. 2 is a flowchart of a data transmission method according to some embodiments of the present disclosure.

Referring to FIG. 2, FIG. 2 is a flowchart of a data transmission method provided by some embodiments of the present disclosure as shown in FIG. 2, the data transmission method is applied to a terminal, and includes the following steps:

Step 201: receiving configuration information of a transmission layer quantity and SRS resource configuration information for uplink channel quality measurement sent by a base station.

Step 202: sending an SRS signal on a configured SRS resource.

Step 203: receiving uplink transmission indication information sent by the base station.

Step 204: acquiring a precoding matrix for uplink data transmission according to the uplink transmission indication information.

An execution order of the step 201 and the step 202 is not limited, the step 201 may be executed before the step 202, the step 201 may be executed after the step 202. The step 201 may also be executed simultaneously with the step 202.

Optionally, the method may further include determining, according to the SRS resource configuration information and the configuration information of the transmission layer quantity, a payload corresponding to the uplink transmission indication information sent by the base station, wherein, acquiring a precoding matrix for uplink data transmission according to the uplink transmission indication information further includes decoding the uplink transmission indication information according to the payload, acquiring the precoding matrix for uplink data transmission based on a result of the decoding. This step may be performed after the step 202 and before the step 203, or may be performed after the step 203 and before the step 204, and the present embodiment is not limited thereto.

Optionally, determining, according to the SRS resource configuration information and the configuration information of the transmission layer quantity, the payload corresponding to the uplink transmission indication information sent by the base station includes one of (i) to (v):

(i) determining, according to one of the maximum quantity of antenna ports and the maximum quantity of transmission layers for uplink transmission allowed for the terminal and according to the SRS resource configuration information, the payload corresponding to the uplink transmission indication information sent by the base station;

(ii) determining, according to the maximum quantity of transmission layers allowed within the maximum uplink transmission capability of the terminal and the SRS resource configuration information, the payload corresponding to the uplink transmission indication information sent by the base station;

(iii) determining, according to the maximum quantity of layers in the configuration information of the transmission layer quantity and the SRS resource configuration information, the payload corresponding to the uplink transmission indication information sent by the base station;

(iv) determining, according to elements in a layer quantity set indicated by the configuration information of the transmission layer quantity and the SRS resource configuration information, the payload corresponding to the uplink transmission indication information sent by the base station;

(v) determining, according to the quantity of elements in the layer quantity set indicated by the configuration information of the transmission layer quantity and the SRS resource configuration information, the payload corresponding to the uplink transmission indication information sent by the base station.

Optionally, the step 204 may further include decoding the uplink transmission indication information according to the payload, and acquiring the precoding matrix for uplink data transmission based on a result of the decoding.

Optionally, the uplink transmission indication information includes at least one of target indication information and mapping relationship information; wherein the target indication information includes at least one of an SRS resource indicator (SRI), a Transmission Rank indicator (TRI), and indication information of an SRS port in the SRS resource.

The mapping relationship information includes at least one of: order information of SRS resources, order information of SRS ports in the SRS resources, mapping relationship information between SRS resources and reference signal ports, mapping relationship information between SRS resources and layers, mapping relationship information between SRS ports in the SRS resources and reference signal ports, and mapping relationship information between the SRS ports in the SRS resource and layers.

Optionally, the mapping relationship between the SRS resources and the reference signal ports includes: the SRS resource and the reference signal port being sent using the same precoding matrix; and/or the mapping relationship between the SRS resources and the layers includes: the SRS resource and the layer being sent using the same precoding matrix; and/or the mapping relationship between the SRS ports and the reference signal ports includes: the SRS port and the reference signal being sent using the same precoding matrix; and/or the mapping relationship between the SRS ports and the layers includes: the SRS ports and the layer being sent using the same precoding matrix.

Optionally, the method further includes: making an agreement with the base station in advance on mapping relationship between the uplink transmission indication information and reference signal ports or mapping relationship between the uplink transmission indication information and layers or specifying in advance in a protocol mapping relationship between the uplink transmission indication information and reference signal ports or mapping relationship between the uplink transmission indication information and layers; or receiving mapping relationship between the uplink transmission indication information and reference signal ports sent by the base station or mapping relationship between the uplink transmission indication information and layers.

Optionally, the uplink transmission indication information is SRS resource indicator information.

Optionally, the reference signal port is a DMRS port of a PUSCH. Optionally, the reference signal port is a DMRS port of a PUCCH. Optionally, mapping relationship between the uplink transmission indication information and the reference signal ports is spatial QCL relationship.

Optionally, acquiring a precoding matrix for uplink data transmission according to the uplink transmission indication information, includes: determining a precoding vector/matrix corresponding to each reference signal port according to the mapping relationship information between the SRS resources and the reference signal ports or the mapping relationship information between the SRS ports and the reference signal ports; acquiring the precoding matrix for uplink data transmission according to the precoding vector/matrix corresponding to the each reference signal port.

If the uplink transmission indication information includes the SRS resource indicator information, the mapping relationship is mapping relationship between the indicated SRS resources and the reference signal ports, and is the spatial QCL relationship, then determining the precoding vector/matrix corresponding to each reference signal port according to the mapping relationship information between the SRS resources and the reference signal ports is as follows: for a reference signal corresponding to each reference signal port, the precoding vector/matrix is a transmission beam of a SRS corresponding to a SRS resource indicated by a transmission SRS resource. Acquiring a precoding matrix for uplink data transmission according to a precoding vector/matrix corresponding to each reference signal port is as follows: for a data stream corresponding to any reference signal port in uplink data, the precoding vector/matrix is the same precoding vector/matrix as the DMRS port.

If the uplink transmission indication information includes SRS resource indicator information and/or SRS port indication information, the mapping relationship is mapping relationship between the indicated SRS ports and reference signal ports, and is spatial QCL relationship, then determining the precoding vector/matrix corresponding to each reference signal port according to the mapping relationship information between the SRS ports and the reference signal ports is as follows: for a reference signal corresponding to each reference signal port, the precoding vector/matrix is a transmission beam corresponding to a SRS port indicated by the uplink transmission indication information. Acquiring a precoding matrix for uplink data transmission according to a precoding vector/matrix corresponding to each reference signal port is as follows: for a data stream corresponding to any reference signal port in the uplink data, the precoding vector/matrix is the same precoding vector/matrix as the DMRS port.

Optionally, acquiring a precoding matrix for uplink data transmission according to the uplink transmission indication information includes: determining a precoding vector/matrix corresponding to each layer according to the mapping relationship information between the SRS resource and the layer or the mapping relationship information between the SRS ports and the layers; acquiring a precoding matrix for uplink data transmission according to a precoding vector/matrix corresponding to each layer.

If the uplink transmission indication information includes SRS resource indicator information, the mapping relationship is mapping relationship between the indicated SRS resources and layers, and is spatial QCL relationship, then determining the precoding vector/matrix corresponding to each layer according to the mapping relationship information between the SRS resources and the layers is as follows: for each layer, the precoding vector/matrix is a transmission beam of a SRS corresponding to a SRS resource being sent. Acquiring a precoding matrix for uplink data transmission according to a precoding vector/matrix corresponding to each layer is as follows: the terminal may acquire an overall precoding matrix of all layers for uplink data transmission according to a precoding vector/matrix of each layer.

If the uplink transmission indication information includes SRS resource indicator information, the mapping relationship is mapping relationship between the indicated SRS resources and layers, and is spatial QCL relationship, then determining the precoding vector/matrix corresponding to each layer according to the mapping relationship information between the SRS resources and the layers is as follows: for each layer, the precoding vector/matrix is a transmission beam of a SRS port corresponding to the precoding vector/matrix being sent. Acquiring a precoding matrix for uplink data transmission according to a precoding vector/matrix corresponding to each layer is as follows: the terminal may acquire an overall precoding matrix of all layers for uplink data transmission according to a precoding vector/matrix of each layer.

Optionally, the uplink data is data sent on the PUSCH, and the layer is a layer of a PUSCH. Optionally, the uplink data is a DMRS of a PUSCH, and the layer is data corresponding to an antenna port of the DMRS. Optionally, the uplink data is data transmitted on the PUCCH, and the layer is a layer of the PUCCH. Optionally, the uplink data is the DMRS of the PUCCH, and the layer is data corresponding to the DMRS port. Of course, it should be understood that the uplink data may also be a combination of the above listed data, or other uplink data, all of the data is within a protection scope of the present disclosure. For example, the uplink data is data sent on the PUSCH and data sent on the DMRS of the PUSCH, and the like.

Some embodiments of the present disclosure may be implemented in conjunction with the embodiment shown in FIG. 1, and have the same advantageous effects, which will not be described in detail in order to avoid repetition.

Figure 3:
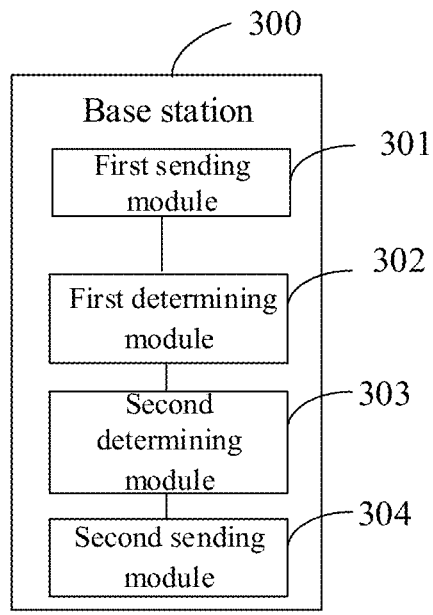
FIG. 3 is a structural diagram of a base station according to some embodiments of the present disclosure.

Referring to FIG. 3, FIG. 3 is a structural diagram of a base station provided by some embodiments of the present disclosure. As shown in FIG. 3, the base station 300 includes a first sending module 301, a first determining module 302, a second determining module 303 and a second sending module 304.

The first sending module 301 is configured to send SRS resource configuration information for uplink channel quality measurement and configuration information of a transmission layer quantity. The configuration information of the transmission layer quantity includes a set of the maximum quantities of transmission layers allowed to be transmitted by a terminal or the quantity of layers allowed to be transmitted by the terminal. The first determining module 302 is configured to determine uplink transmission indication information. The second determining module 303 is configured to determine a payload corresponding to the uplink transmission indication information according to the SRS resource configuration information and the configuration information of the transmission layer quantity. The second sending module 304 is configured to send the uplink transmission indication information to the terminal using the payload.

Optionally, the second determination module 303 is specifically configured to perform one of the following (i) to (v):

(i) determining the payload corresponding to the uplink transmission indication information according to one of the maximum quantity of antenna ports and the maximum quantity of transmission layers for uplink transmission allowed for the terminal and according to the SRS resource configuration information;

(ii) determining the payload corresponding to the uplink transmission indication information according to the maximum quantity of transmission layers allowed within a maximum uplink transmission capability of the terminal and according to the SRS resource configuration information;

(iii) determining the payload corresponding to the uplink transmission indication information according to the maximum layer quantity in the configuration information of the transmission layer quantity and according to the SRS resource configuration information;

(iv) determining the payload corresponding to the uplink transmission indication information according to one or more elements in a layer quantity set indicated by the configuration information of the transmission layer quantity and according to the SRS resource configuration information;

(v) determining the payload corresponding to the uplink transmission indication information according to the quantity of elements in the layer quantity set indicated by the configuration information of the transmission layer quantity and according to the SRS resource configuration information.

Optionally, the second determining module 303 is specifically configured to: measure, by the base station, an SRS signal and select a TRI and/or an SRS resource and/or an SRS port according to a result of the measurement; and determine the payload corresponding to the uplink transmission indication information according to at least one of the quantity of TRI, the quantity of SRS ports, and the quantity of SRS resources selected by the base station and the SRS resource configuration information.

Optionally, the second determining module 303 is specifically configured to: in a case that determining the payload corresponding to the uplink transmission indication information according to the SRS resource configuration information and the configuration information of the transmission layer quantity includes at least two determination manners, send payload determination manner indication information to the terminal by the base station. The payload determination manner indication information is instruction information indicating a determination manner for determining the payload corresponding to the uplink transmission indication information according to the SRS resource configuration information and the configuration information of the transmission layer quantity.

Optionally, the uplink transmission indication information includes at least one of target indication information and mapping relationship information.

The mapping relationship information includes at least one of following: order information of SRS resources, order information of SRS ports in the SRS resources, mapping relationship information between the SRS resources and reference signal ports, mapping relationship information between the SRS resources and layers, mapping relationship information, and mapping relationship information between the SRS ports in the SRS resources and the layers.

Optionally, the mapping relationship between the SRS resources and the reference signal ports includes: the SRS resource and the reference signal port being sent using the same precoding matrix; and/or the mapping relationship between the SRS resources and the layers includes: the SRS resource and the layer being sent using the same precoding matrix, or the SRS resources and the layers being sent using the same precoding matrix; and/or the mapping relationship between the SRS port sand the reference signal ports includes: the SRS port and the reference signal being sent using the same precoding matrix, the SRS ports and the reference signals being sent using the same precoding matrix; and/or the mapping relationship between the SRS ports and the layers includes: the SRS port and the layer being sent using the same precoding matrix, the SRS ports and the layers being sent using the same precoding matrix.

Optionally, the base station further includes an agreement module, wherein the agreement module is configured to make an agreement with the terminal on mapping relationship between the uplink transmission indication information and reference signal ports or mapping relationship between the uplink transmission indication information and layers or specify in advance in a protocol mapping relationship between the uplink transmission indication information and reference signal ports or mapping relationship between the uplink transmission indication information and layers.

Optionally, the first determining module 302 is specifically configured to receive an SRS signal sent by the terminal on the SRS resources; and determine the uplink transmission indication information according to the SRS signal.

It should be noted that the base station 300 in this embodiment may be a base station of any of method embodiments in some embodiments of the present disclosure. Any embodiment of the base station in the method embodiments in some embodiments of the present disclosure may be implemented by the base station 300 in the present embodiment, and achieve the same advantageous effects, which will not be described here.

Figure 4:
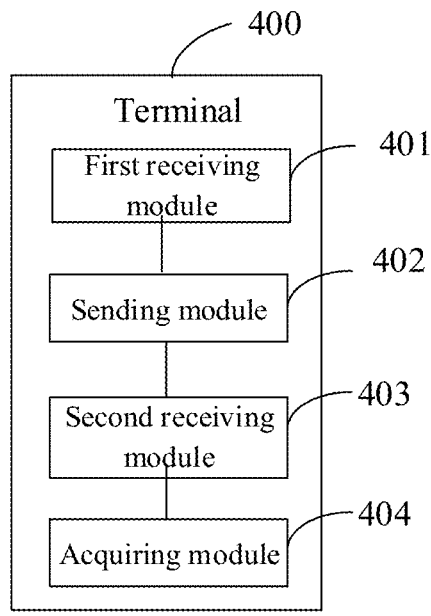
FIG. 4 is a structural diagram of a terminal according to some embodiments of the present disclosure.

Referring to FIG. 4, FIG. 4 is a schematic structural diagram of a terminal provided by some embodiments of the present disclosure. As shown in FIG. 4, the terminal 400 includes a first receiving module 401, a sending module 402, a second receiving module 403 and an acquiring module 404.

The first receiving module 401 is configured to receive configuration information of a transmission layer quantity and SRS resource configuration information for uplink channel quality measurement sent by a base station. The sending module 402 is configured to send an SRS signal on a configured SRS resource. The second receiving module 403 is configured to receive uplink transmission indication information sent by the base station. The acquiring module 404 is configured to acquire a precoding matrix for uplink data transmission according to the uplink transmission indication information.

Optionally, the terminal further includes a determining module, wherein the determining module is configured to determine, according to the SRS resource configuration information and the configuration information of the transmission layer quantity, a payload corresponding to the uplink transmission indication information sent by the base station, wherein the acquiring module is further configured to decode the uplink transmission indication information according to the payload, and acquire the precoding matrix for uplink data transmission based on a result of the decoding.

Optionally, the determining module is specifically configured to perform one of the following (i) to (v):

(i) determining, according to one of the maximum quantity of antenna ports and the maximum quantity of transmission layers for uplink transmission allowed for the terminal and according to the SRS resource configuration information, the payload corresponding to the uplink transmission indication information sent by the base station;

(ii) determining, according to the maximum quantity of transmission layers allowed within the maximum uplink transmission capability of the terminal and the SRS resource configuration information, the payload corresponding to the uplink transmission indication information sent by the base station;

(iii) determining, according to the maximum quantity of layers in the configuration information of the transmission layer quantity and the SRS resource configuration information, the payload corresponding to the uplink transmission indication information sent by the base station;

(iv) determining, according to elements in a layer quantity set indicated by the configuration information of the transmission layer quantity and the SRS resource configuration information, the payload corresponding to the uplink transmission indication information sent by the base station;

(v) determining, according to the quantity of elements in the layer quantity set indicated by the configuration information of the transmission layer quantity and the SRS resource configuration information, the payload corresponding to the uplink transmission indication information sent by the base station.

The acquiring module 404 is further configured to decode the uplink transmission indication information according to the payload, and acquire the precoding matrix for uplink data transmission based on a result of the decoding.

Optionally, the uplink transmission indication information includes at least one of target indication information and mapping relationship information; wherein the target indication information includes at least one of an SRS resource indicator (SRI), a Transmission Rank indicator (TRI), and indication information of an SRS port in the SRS resource.

The mapping relationship information includes at least one of: order information of SRS resources, order information of SRS ports in the SRS resources, mapping relationship information between SRS resources and reference signal ports, mapping relationship information between SRS resources and layers, mapping relationship information between SRS ports in the SRS resources and reference signal ports, and mapping relationship information between the SRS ports in the SRS resource and layers.

Optionally, the mapping relationship between the SRS resources and the reference signal ports includes: the SRS resource and the reference signal port being sent using the same precoding matrix, or the SRS resources and the reference signal ports being sent using the same precoding matrix; and/or the mapping relationship between the SRS resource and the layer includes: the SRS resource and the layer being sent using the same precoding matrix, or the SRS resources and the layers being sent using the same precoding matrix; and/or the mapping relationship between the SRS ports and the reference signal ports includes: the SRS port and the reference signal being sent using the same precoding matrix, or the SRS ports and the reference signals being sent using the same precoding matrix; and/or the mapping relationship between the SRS ports and the layers includes: the SRS port and the layer being sent using the same precoding matrix, or the SRS ports and the layers being sent using the same precoding matrix.

Optionally, the acquiring module 404 is specifically configured to: determine a precoding vector/matrix corresponding to each reference signal port according to the mapping relationship information between the SRS resources and the reference signal ports or the mapping relationship information between the SRS ports and the reference signal ports; acquire the precoding matrix for uplink data transmission according to the precoding vector/matrix corresponding to the each reference signal port.

Optionally, the acquiring module 404 is specifically configured to: determine a precoding vector/matrix corresponding to each layer according to the mapping relationship information between the SRS resource and the layer or the mapping relationship information between the SRS ports and the layers; acquire a precoding matrix for uplink data transmission according to a precoding vector/matrix corresponding to each layer.

Optionally, the terminal further includes an agreement module, wherein the agreement module is configured to: make an agreement with the base station on mapping relationship between the uplink transmission indication information and reference signal ports or mapping relationship between the uplink transmission indication information and layers or specify in advance in a protocol mapping relationship between the uplink transmission indication information and reference signal ports or mapping relationship between the uplink transmission indication information and layers.

Figure 5:
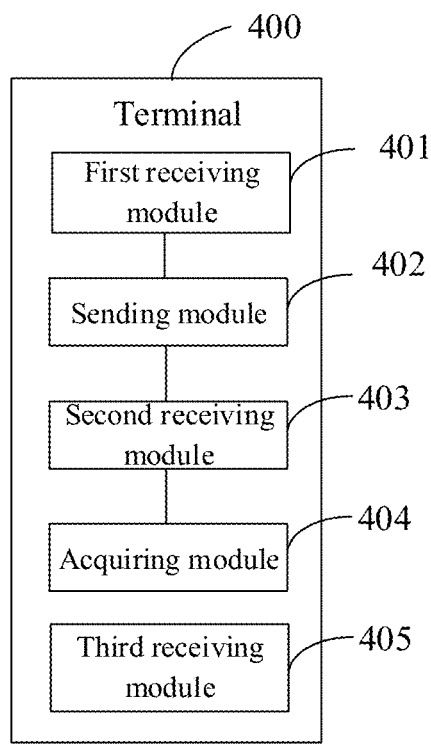
FIG. 5 is a structural diagram of a terminal according to some embodiments of the present disclosure.

Optionally, as shown in FIG. 5, the terminal further includes a third receiving module 405, configured to receive the uplink transmission indication information.

It should be noted that the terminal 400 in this embodiment may be a terminal of any of the method embodiments in some embodiments of the present disclosure. Any embodiment of the terminal in the method embodiments in some embodiments of the present disclosure can be implemented by the terminal 400 in the present embodiment, and achieve the same beneficial effect, which will not be described here.

Figure 6:
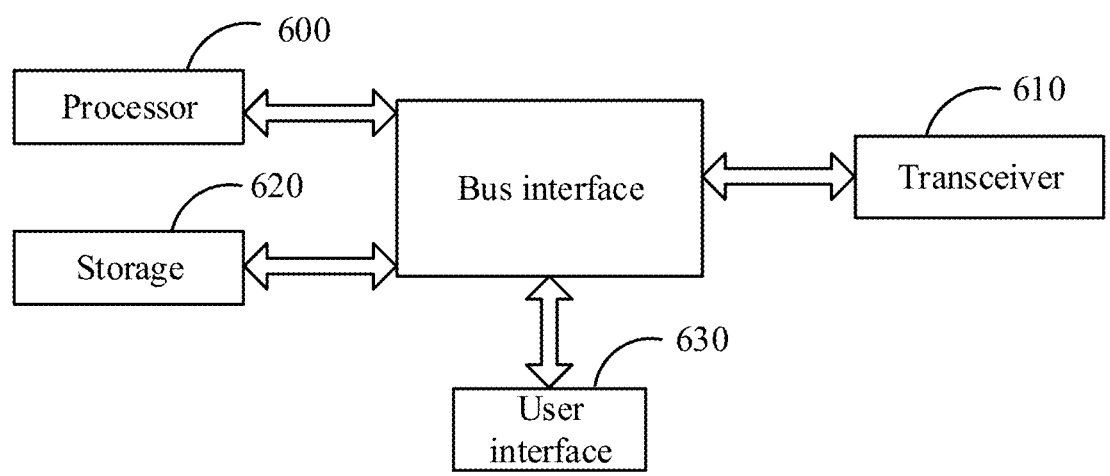
FIG. 6 is a structural diagram of a base station according to some embodiments of the present disclosure.

Referring to FIG. 6, FIG. 6 is a schematic structural diagram of a base station provided by some embodiments of the present disclosure. As shown in FIG. 6, the base station includes a processor 600, a transceiver 610, a storage 620, a user interface 630, and a bus interface. The processor 600 is configured to read a program in the storage 620 and perform following processes: sending SRS resource configuration information for uplink channel quality measurement and configuration information of a transmission layer quantity through the transceiver 610; the configuration information of the transmission layer quantity includes a set of the maximum quantities of transmission layers allowed to be transmitted by a terminal or the quantity of layers allowed to be transmitted by the terminal; determining uplink transmission indication information; determining a payload corresponding to the uplink transmission indication information according to the SRS resource configuration information and the configuration information of the transmission layer quantity; sending the uplink transmission indication information to the terminal through the transceiver 610 using the payload.

The transceiver 610 is configured to receive and transmit data under a control of the processor 600.

In FIG. 6, a bus architecture may include any quantity of interconnected buses and bridges, specifically one or more processors represented by the processor 600 and a storage represented by the storage 620 are linked together. The bus architecture may also link together a variety of other circuits, such as peripheral devices, voltage regulators, and power management circuits, which are well known in the art and, therefore, will not be described further herein. The bus interface provides an interface. The transceiver 610 may be a plurality of elements, including a transmitter and a receiver, for providing means for communicating with various other devices over a transmission medium. For different terminals, the user interface 630 may also be an interface capable of internally or externally connecting necessary devices that include, but are not limited to, a keypad, a display, a speaker, a microphone, a joystick, and the like.

The processor 600 is responsible for managing the bus architecture and general processing, and the storage 620 may store data used by the processor 600 when the processor 600 performs an operation.

Optionally, the processor 600 is further configured to perform one of the following (i) to (v):

(i) determining the payload corresponding to the uplink transmission indication information according to one of the maximum quantity of antenna ports and the maximum quantity of transmission layers for uplink transmission allowed for the terminal and according to the SRS resource configuration information;

(ii) determining the payload corresponding to the uplink transmission indication information according to the maximum quantity of transmission layers allowed within a maximum uplink transmission capability of the terminal and according to the SRS resource configuration information;

(iii) determining the payload corresponding to the uplink transmission indication information according to the maximum layer quantity in the configuration information of the transmission layer quantity and according to the SRS resource configuration information;

(iv) determining the payload corresponding to the uplink transmission indication information according to one or more elements in a layer quantity set indicated by the configuration information of the transmission layer quantity and according to the SRS resource configuration information;

(v) determining the payload corresponding to the uplink transmission indication information according to the quantity of elements in the layer quantity set indicated by the configuration information of the transmission layer quantity and according to the SRS resource configuration information.

Optionally, the processor 600 is further configured to: measure, by the base station, an SRS signal and select a TRI and/or an SRS resource and/or an SRS port according to a result of the measurement; and determine the payload corresponding to the uplink transmission indication information according to at least one of the quantity of TRI, the quantity of SRS ports, and the quantity of SRS resources selected by the base station and the SRS resource configuration information.

Optionally, the processor 600 is further configured to: in a case that determining the payload corresponding to the uplink transmission indication information according to the SRS resource configuration information and the configuration information of the transmission layer quantity includes at least two determination manners, send payload determination manner indication information to the terminal by the base station. The payload determination manner indication information is instruction information indicating a determination manner for determining the payload corresponding to the uplink transmission indication information according to the SRS resource configuration information and the configuration information of the transmission layer quantity.

Optionally, the uplink transmission indication information includes at least one of target indication information and mapping relationship information.

The target indication information includes at least one of an SRS resource indicator (SRI), a Transmission Rank indicator (TRI), and indication information of an SRS port in the SRS resource.

The mapping relationship information includes at least one of following: order information of SRS resources, order information of SRS ports in the SRS resources, mapping relationship information between the SRS resources and reference signal ports, mapping relationship information between the SRS resources and layers, mapping relationship information between the SRS ports in the SRS resources and the reference signal ports, and mapping relationship information between the SRS ports in the SRS resources and the layers.

Optionally, the mapping relationship between the SRS resources and the reference signal ports includes: the SRS resource and the reference signal port being sent using the same precoding matrix, or the SRS resources and the reference signal ports being sent using the same precoding matrix; and/or the mapping relationship between the SRS resources and the layers includes: the SRS resource and the layer being sent using the same precoding matrix, or the SRS resources and the layers being sent using the same precoding matrix; and/or the mapping relationship between the SRS ports and the reference signal ports includes: the SRS port and the reference signal being sent using the same precoding matrix, or the SRS ports and the reference signals being sent using the same precoding matrix; and/or the mapping relationship between the SRS ports and the layers includes: the SRS port and the layer being sent using the same precoding matrix, or the SRS ports and the layers being sent using the same precoding matrix.

Optionally, the processor 600 is further configured to: make an agreement with the terminal on mapping relationship between the uplink transmission indication information and reference signal ports or mapping relationship between the uplink transmission indication information and layers or specify in advance in a protocol mapping relationship between the uplink transmission indication information and reference signal ports or mapping relationship between the uplink transmission indication information and layers.

Optionally, determining the uplink transmission indication information includes: receiving an SRS signal sent by the terminal on the SRS resources; and determining the uplink transmission indication information according to the SRS signal.

It should be noted that the base station in this embodiment may be a base station of any of method embodiments in some embodiments of the present disclosure. Any embodiment of the base station in the method embodiments in some embodiments of the present disclosure may be implemented by the base station in the present embodiment, and achieve the same advantageous effects, which will not be described here.

Figure 7:
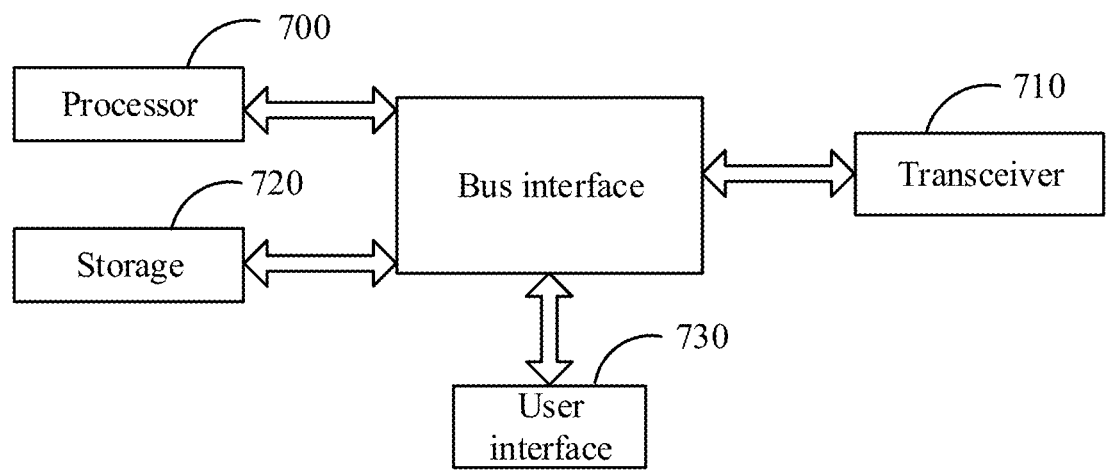
FIG. 7 is a structural diagram of a terminal according to some embodiments of the present disclosure.

Referring to FIG. 7, FIG. 7 is a schematic structural diagram of a terminal provided by some embodiments of the present disclosure. As shown in FIG. 7, the terminal includes a processor 700, a transceiver 710, a storage 720, a user interface 730, and a bus interface. The processor 700 is configured to read a program in the storage 620 and perform following processes.

The processor 700 is configured to read the program in the memory 720 and perform the following processes: receiving, through the transceiver 710, configuration information of a transmission layer quantity and SRS resource configuration information for uplink channel quality measurement sent by a base station; sending an SRS signal on a configured SRS resource through the transceiver 710; determining, according to the SRS resource configuration information and the configuration information of the transmission layer quantity, a payload corresponding to the uplink transmission indication information sent by the base station; receiving, through the transceiver 710, uplink transmission indication information sent by the base station; acquiring a precoding matrix for uplink data transmission according to the uplink transmission indication information.

The transceiver 710 is configured to receive and transmit data under a control of the processor 700.

In FIG. 7, a bus architecture may include any quantity of interconnected buses and bridges, specifically one or more processors represented by the processor 700 and a storage represented by the storage 720 are linked together. The bus architecture may also link together a variety of other circuits, such as peripheral devices, voltage regulators, and power management circuits, which are well known in the art and, therefore, will not be described further herein. The bus interface provides an interface. The transceiver 710 may be a plurality of elements, including a transmitter and a receiver, for providing means for communicating with various other devices over a transmission medium. For different terminals, the user interface 730 may also be an interface capable of internally or externally connecting necessary devices that include, but are not limited to, a keypad, a display, a speaker, a microphone, a joystick, and the like.

The processor 700 is responsible for managing the bus architecture and general processing, and the storage 720 may store data used by the processor 700 when the processor 700 performs an operation.

Optionally, determining, according to the SRS resource configuration information and the configuration information of the transmission layer quantity, a payload corresponding to the uplink transmission indication information sent by the base station, includes one of the following (i) to (v):

(i) determining, according to one of the maximum quantity of antenna ports and the maximum quantity of transmission layers allowed for uplink transmission allowed for the terminal and according to the SRS resource configuration information, the payload corresponding to the uplink transmission indication information sent by the base station;

(ii) determining, according to the maximum quantity of transmission layers allowed within the maximum uplink transmission capability of the terminal and the SRS resource configuration information, the payload corresponding to the uplink transmission indication information sent by the base station;

(iii) determining, according to the maximum quantity of layers in the configuration information of the transmission layer quantity and the SRS resource configuration information, the payload corresponding to the uplink transmission indication information sent by the base station;

(iv) determining, according to elements in a layer quantity set indicated by the configuration information of the transmission layer quantity and the SRS resource configuration information, the payload corresponding to the uplink transmission indication information sent by the base station;

(v) determining, according to the quantity of elements in the layer quantity set indicated by the configuration information of the transmission layer quantity and the SRS resource configuration information, the payload corresponding to the uplink transmission indication information sent by the base station.

Optionally, acquiring the precoding matrix for uplink data transmission according to the uplink transmission indication information includes decoding the uplink transmission indication information according to the payload, and acquiring the precoding matrix for uplink data transmission based on a result of the decoding.

Optionally, the uplink transmission indication information includes at least one of target indication information and mapping relationship information; wherein the target indication information includes at least one of an SRS resource indicator (SRI), a Transmission Rank indicator (TRI), and indication information of an SRS port in the SRS resource.

The mapping relationship information includes at least one of: order information of SRS resources, order information of SRS ports in the SRS resources, mapping relationship information between SRS resources and reference signal ports, mapping relationship information between SRS resources and layers, mapping relationship information between SRS ports in the SRS resources and reference signal ports, and mapping relationship information between the SRS ports in the SRS resource and layers.

Optionally, the mapping relationship between the SRS resources and the reference signal ports includes: the SRS resource and the reference signal port being sent using the same precoding matrix or the SRS resources and the reference signal ports being sent using the same precoding matrix; and/or the mapping relationship between the SRS resources and the layers includes: the SRS resource and the layer being sent using the same precoding matrix, or the SRS resources and the layers being sent using the same precoding matrix; and/or the mapping relationship between the SRS ports and the reference signal ports includes: the SRS port and the reference signal being sent using the same precoding matrix, or the SRS ports and the reference signals being sent using the same precoding matrix; and/or the mapping relationship between the SRS ports and the layers includes: the SRS port and the layer being sent using the same precoding matrix, or the SRS ports and the layers being sent using the same precoding matrix.

Optionally, the processor 700 is further configured to: determine a precoding vector/matrix corresponding to each reference signal port according to the mapping relationship information between the SRS resources and the reference signal ports or the mapping relationship information between the SRS ports and the reference signal ports;

acquire the precoding matrix for uplink data transmission according to the precoding vector/matrix corresponding to the each reference signal port.

Optionally, the processor 700 is further configured to: determine a precoding vector/matrix corresponding to each layer according to the mapping relationship information between the SRS resource and the layer or the mapping relationship information between the SRS ports and the layers; acquire a precoding matrix for uplink data transmission according to a precoding vector/matrix corresponding to each layer.

Optionally, the processor 700 is further configured to: make an agreement in advance with the base station on mapping relationship between the uplink transmission indication information and reference signal ports or mapping relationship between the uplink transmission indication information and layers or specify in advance in a protocol mapping relationship between the uplink transmission indication information and reference signal ports or mapping relationship between the uplink transmission indication information and layers; or receive the mapping relationship between the uplink transmission indication information and the reference signal ports or the mapping relationship between the uplink transmission indication information and layers sent by the base station.

Optionally, the processor 700 is further configured to receive the uplink transmission indication information.

It should be noted that the embodiments of the present disclosure may be applicable to a Fifth Generation (5G) system, or may be applicable to other wireless communication systems or an evolved version thereof, such as a Long Term Evolution (LTE) system, a Global System for Mobile Communication (GSM), a Universal Mobile Telecommunications System (UMTS), a Code Division Multiple Access (CDMA) system, other systems based on Orthogonal Frequency Division Multiplexing (OFDM) and a new wireless communication system, a Sixth Generation (6G system), etc.

It should be noted that the terminal in this embodiment may be a terminal of any of the method embodiments in some embodiments of the present disclosure. Any embodiment of the terminal in the method embodiments in some embodiments of the present disclosure can be implemented by the terminal in the present embodiment, and achieve the same beneficial effect, which will not be described here.

In some embodiments of that present disclosure, the involved devices include a sending device (i.e., a base station) and a receiving device (i.e., a terminal), and downlink transmission and uplink reception may be performed between the sending device and the receiving device accessing the sending device.

The base station may be a base station or another type of transmission point devices in an existing equipment, and the terminal may be a user equipment. Of course, the present disclosure is not limited to the above two devices. For example, the base station may be a terminal capable of performing configuration and operation for other terminals. A base station may also be considered to contain multiple network nodes. The network nodes may include only a radio frequency (e.g., a Remote Radio Unit), RRU) or includes both a baseband component and a radio frequency component (e.g., an active antenna). The network node may include only a baseband (e.g., a Baseband Unit (BBU)); or does not include any digital/radio frequency function in any air-interface layer, and is only responsible for higher-layer signal processing, and baseband processing of the air-interface layer is placed on the active antenna. There are also many other network implementations.

The terminal may also be referred to as a User Equipment (UE) or may be referred to as a terminal, a Mobile Station (MS), a Mobile Terminal or the like, which can communicate with one or more core networks via a Radio Access Network (RAN). For example, the terminal may be a mobile phone (or a "cellular" phone), a computer with a mobile terminal, etc., for example, the terminal may also be a portable device, a pocket-sized device, a handheld device, a computer built-in device or an in-vehicle mobile device, which exchange voice and/or data with the radio access network. The terminal in some embodiments of the present disclosure may also be a Device to Device (D2D) terminal or a Machine to Machine (M2M) terminal. The network device and the terminal are not particularly limited in the embodiments of the present disclosure.

In some embodiments of that present disclosure, the involved precoding matrix/vector may be a precoding matrix or vector, or may be multiple precoding vectors, the precoding matrix/vector may also be referred to as "precoding", "beam", or, referred to as "beamforming," may include only analog precoding, may include only digital precoding, or may be analog and digital hybrid precoding. It should be understood that, in the embodiments of the present disclosure, the precoding matrix/vector is not limited to include only a specific quantity of precoding, and the nomenclature of the precoding matrix/vector is not limited.

In addition, some embodiments of that present disclosure provide a computer-readable storage medium having a computer program stored thereon. When the computer program is executed by a processor, the processor may perform the steps of the data transmission method applied to a base station provided by some embodiments of the present disclosure; or, when the computer program is executed by a processor, the processor may perform the steps in the data transmission method applied to a terminal provided by some embodiments of the present disclosure.

In several embodiments provided in the present disclosure, it should be understood that the disclosed method and device may be implemented in other ways. For example, the device embodiments described above are merely illustrative. For example, a division of units is only a logical functional division, and may be implemented in another division manner in actual application. For example, multiple units or components may be combined or integrated into another system, or some features may be ignored, or not performed. Optionally, coupling or direct coupling or communication connection shown or discussed between components may be an indirect coupling or communication connection through some interfaces, devices or units, and may be in an electrical, mechanical or other form.

In addition, various functional units in various embodiments of the present disclosure may be integrated in a processing unit, may be separately physically included in a unit, or two or more of the functional units may be integrated in a unit. The integrated unit can be realized either in a form of hardware or in a form of hardware plus a software function unit.

The integrated unit described above in a form of a software functional unit may be stored in a computer readable storage medium. The above-described software functional unit is stored in a storage medium and includes instructions for causing a computer device (which may be a personal computer, a server, or a network device, etc.) to perform a part of the steps of the sending method and the receiving method of various embodiments of the present disclosure. The aforementioned storage medium may be a volatile computer-readable storage medium or a non-volatile computer-readable storage medium including a variety of media capable of storing program codes, such as a U disk, a removable hard disk, a Read-Only Memory (ROM), a Random Access Memory (RAM), a magnetic disk, or an optical disk.

In the present disclosure, ⌈a⌉ denotes a ceiling function for a, that is, a minimum integer larger than "a" is taken; ⌊a⌋ denotes a floor function for a, that is, a maximum integer smaller than "a" is taken.

The foregoing describes some embodiments of the present disclosure and it should be noted that several modifications and refinements may be made by those of ordinary skills in the art without departing from the principles of the present disclosure. These modifications and refinements should also be considered to be within the scope of the present disclosure.

What is claimed is:

1. A data transmission method applied to a base station, comprising:
   sending Sounding Reference Signal (SRS) resource configuration information for uplink channel quality measurement and configuration information of a transmission layer quantity, wherein the configuration information of the transmission layer quantity comprises the maximum quantity of transmission layers allowed to be transmitted by a terminal or a set of quantities of layers allowed to be transmitted by the terminal;
   determining uplink transmission indication information;
   determining a payload corresponding to the uplink transmission indication information according to the SRS resource configuration information and the configuration information of the transmission layer quantity;
   sending the uplink transmission indication information to the terminal using the payload.

2. The method according to claim 1, wherein determining the payload corresponding to the uplink transmission indication information according to the SRS resource configuration information and the configuration information of the transmission layer quantity, comprises one of following (i) to (v):
   (i) determining the payload corresponding to the uplink transmission indication information according to one of a maximum quantity of antenna ports and a maximum quantity of transmission layers for uplink transmission allowed for the terminal and according to the SRS resource configuration information;
   (ii) determining the payload corresponding to the uplink transmission indication information according to the maximum quantity of transmission layers allowed within a maximum uplink transmission capability of the terminal and according to the SRS resource configuration information;
   (iii) determining the payload corresponding to the uplink transmission indication information according to a maximum quantity of layers in the configuration information of the transmission layer quantity and according to the SRS resource configuration information;
   (iv) determining the payload corresponding to the uplink transmission indication information according to one or more elements in a layer quantity set indicated by the configuration information of the transmission layer quantity and according to the SRS resource configuration information;
   (v) determining the payload corresponding to the uplink transmission indication information according to the quantity of elements in the layer quantity set indicated by the configuration information of the transmission layer quantity and according to the SRS resource configuration information.

3. The method according to claim 2, wherein determining the payload corresponding to the uplink transmission indication information according to the SRS resource configuration information and the configuration information of the transmission layer quantity, further comprises:
   sending payload determination manner indication information to the terminal by the base station,
   wherein the payload determination manner indication information is instruction information indicating a determination manner for determining the payload corresponding to the uplink transmission indication information according to the SRS resource configuration information and the configuration information of the transmission layer quantity.

4. The method according to claim 1, wherein determining the payload corresponding to the uplink transmission indication information according to the SRS resource configuration information and the configuration information of the transmission layer quantity, comprises:
   measuring, by the base station, an SRS signal and selecting at least one of a Transmission Rank indicator (TRI), an SRS resource, and an SRS port according to a result of the measurement; and
   determining the payload corresponding to the uplink transmission indication information according to at least one of the quantity of TRIs, the quantity of SRS ports, and the quantity of SRS resources selected by the base station and according to the SRS resource configuration information.

5. The method according to claim 1, wherein the uplink transmission indication information comprises at least one of target indication information and mapping relationship information;
   the target indication information comprises at least one of an SRS resource indicator (SRI), a Transmission Rank indicator (TRI), and indication information of an SRS port in a SRS resource;
   the mapping relationship information comprises at least one of: order information of SRS resources, order information of SRS ports in the SRS resources, mapping relationship information between the SRS resources and reference signal ports, mapping relationship information between the SRS resources and layers, mapping relationship information between the SRS ports in the SRS resources and the reference signal ports, and mapping relationship information between the SRS port in the SRS resource and the layer.

6. The method according to claim 5, wherein,
   the mapping relationship information between the SRS resources and the reference signal ports comprises: the SRS resource and the reference signal port being sent using a same precoding matrix or the SRS resources and the reference signal ports being sent using a same precoding matrix; and/or
   the mapping relationship information between the SRS resources and the layers comprises: the SRS resource and the layer being sent using a same precoding matrix, or the SRS resources and the layers being sent using a same precoding matrix; and/or
   the mapping relationship information between the SRS ports and the reference signal ports comprises: the SRS port and reference signal being sent using the same precoding matrix, or the SRS ports and reference signals being sent using the same precoding matrix; and/or the mapping relationship information between the SRS ports and the layers comprises: the SRS port and the layer being sent using the same precoding matrix, or the SRS ports and the layers being sent using the same precoding matrix.

7. The method according to claim 1, further including:
making an agreement with the terminal on mapping relationship between the uplink transmission indication information and reference signal ports or mapping relationship between the uplink transmission indication information and layers or specifying in advance in a protocol mapping relationship between the uplink transmission indication information and reference signal ports or mapping relationship between the uplink transmission indication information and layers.

8. The method according to claim 1, wherein determining the uplink transmission indication information comprises:
receiving an SRS signal sent by the terminal on the SRS resources; and
determining the uplink transmission indication information according to the SRS signal.

9. A data transmission method applied to a terminal, comprising:
receiving configuration information of a transmission layer quantity and Sounding Reference Signal (SRS) resource configuration information for uplink channel quality measurement sent by a base station;
sending an SRS signal on a configured SRS resource;
determining, according to the SRS resource configuration information and the configuration information of the transmission layer quantity, a payload corresponding to the uplink transmission indication information sent by the base station;
receiving uplink transmission indication information sent by the base station; and
acquiring a precoding matrix for uplink data transmission according to the uplink transmission indication information.

10. The method according to claim 9, wherein determining, according to the SRS resource configuration information and the configuration information of the transmission layer quantity, the payload corresponding to the uplink transmission indication information sent by the base station, comprises one of the following (i) to (v):
(i) determining, according to one of a maximum quantity of antenna ports and a maximum quantity of transmission layers for uplink transmission allowed for the terminal and the SRS resource configuration information, the payload corresponding to the uplink transmission indication information sent by the base station;
(ii) determining, according to a maximum quantity of transmission layers allowed within a maximum uplink transmission capability of the terminal and the SRS resource configuration information, the payload corresponding to the uplink transmission indication information sent by the base station;
(iii) determining, according to a maximum quantity of layers in the configuration information of the transmission layer quantity and the SRS resource configuration information, the payload corresponding to the uplink transmission indication information sent by the base station;
(iv) determining, according to elements in a layer quantity set indicated by the configuration information of the transmission layer quantity and the SRS resource configuration information, the payload corresponding to the uplink transmission indication information sent by the base station;
(v) determining, according to the quantity of the elements in the layer quantity set indicated by the configuration information of the transmission layer quantity and the SRS resource configuration information, the payload corresponding to the uplink transmission indication information sent by the base station.

11. The method according to claim 9, wherein acquiring the precoding matrix for uplink data transmission according to the uplink transmission indication information comprises:
decoding the uplink transmission indication information according to the payload, and acquiring the precoding matrix for uplink data transmission based on a result of the decoding.

12. The method according to claim 9, wherein the uplink transmission indication information comprises at least one of target indication information and mapping relationship information;
the target indication information comprises at least one of an SRS resource indicator (SRI), a Transmission Rank indicator (TRI), and indication information of an SRS port in an SRS resource;
the mapping relationship information comprises at least one of: order information of SRS resources, order information of SRS ports in the SRS resources, mapping relationship information between SRS resources and reference signal ports, mapping relationship information between SRS resources and layers, mapping relationship information between SRS ports in the SRS resources and the reference signal ports, and mapping relationship information between the SRS ports in the SRS resource and layers.

13. The method according to claim 12, wherein,
the mapping relationship information between the SRS resources and the reference signal ports comprises: the SRS resource and the reference signal port being sent using a same precoding matrix, or the SRS resources and the reference signal ports being sent using a same precoding matrix; and/or
the mapping relationship information between the SRS resources and the layers comprises: the SRS resource and the layer being sent using a same precoding matrix, or the SRS resources and the layers being sent using a same precoding matrix; and/or
the mapping relationship information between the SRS ports and the reference signal ports comprises: the SRS port and the reference signal being sent using a same precoding matrix, or the SRS ports and the reference signals being sent using a same precoding matrix; and/or
the mapping relationship information between the SRS ports and the layers comprises: the SRS port and the layer being sent using a same precoding matrix, or the SRS ports and the layers being sent using a same precoding matrix.

14. The method according to claim 13, wherein acquiring the precoding matrix for uplink data transmission according to the uplink transmission indication information, comprises:
determining a precoding vector/matrix corresponding to each reference signal port according to the mapping relationship information between the SRS resources and the reference signal ports or the mapping relationship information between the SRS ports and the reference signal ports;

acquiring the precoding matrix for uplink data transmission according to the precoding vector/matrix corresponding to the each reference signal port.

15. The method according to claim 13, wherein acquiring the precoding matrix for uplink data transmission according to the uplink transmission indication information, comprises:

determining a precoding vector/matrix corresponding to each layer according to the mapping relationship information between the SRS resource and the layer or the mapping relationship information between the SRS ports and the layers;

acquiring a precoding matrix for uplink data transmission according to the precoding vector/matrix corresponding to each layer.

16. The method according to claim 9, further comprising:

making an agreement in advance with the base station on mapping relationship between the uplink transmission indication information and reference signal ports or mapping relationship between the uplink transmission indication information and layers or specifying in advance in a protocol mapping relationship between the uplink transmission indication information and reference signal ports or mapping relationship between the uplink transmission indication information and layers; or receiving the mapping relationship between the uplink transmission indication information and the reference signal ports or the mapping relationship between the uplink transmission indication information and the layers sent by the base station.

17. The method according to claim 9, further comprising:
receiving the uplink transmission indication information.

18. A base station, comprising:

a storage, a processor, a transceiver, and a computer program stored on the storage and executable by the processor; wherein when the processor executes the computer program, the processor implements steps in the method according to claim 1.

19. A terminal, comprising:

a storage, a processor, a transceiver, and a computer program stored on the storage and executable by the processor; wherein when the processor executes the computer program, the processor implements steps in the method according to claim 9.

* * * * *